(12) United States Patent
Nishizawa et al.

(10) Patent No.: US 9,059,982 B2
(45) Date of Patent: Jun. 16, 2015

(54) AUTHENTICATION FEDERATION SYSTEM AND ID PROVIDER DEVICE

(71) Applicants: KABUSHIKI KAISHA TOSHIBA, Minato-ku (JP); TOSHIBA SOLUTIONS CORPORATION, Minato-ku (JP)

(72) Inventors: Minoru Nishizawa, Fuchu (JP); Seiichiro Tanaka, Koshigaya (JP); Tatsuro Ikeda, Fuchu (JP)

(73) Assignees: KABUSHIKI KAISHA TOSHIBA, Minato-ku (JP); TOSHIBA SOLUTIONS CORPORATION, Minato-ku (JP)

( * ) Notice: Subject to any disclaimer, the term of this patent is extended or adjusted under 35 U.S.C. 154(b) by 0 days.

(21) Appl. No.: 13/890,539

(22) Filed: May 9, 2013

(65) Prior Publication Data

US 2013/0247142 A1 Sep. 19, 2013

Related U.S. Application Data

(63) Continuation of application No. PCT/JP2011/075611, filed on Nov. 7, 2011.

(30) Foreign Application Priority Data

Nov. 9, 2010 (JP) ................................. 2010-250903

(51) Int. Cl.
*H04L 29/06* (2006.01)
*G06F 21/60* (2013.01)
*G06F 21/41* (2013.01)

(52) U.S. Cl.
CPC .............. *H04L 63/08* (2013.01); *G06F 21/604* (2013.01); *H04L 63/0815* (2013.01); *G06F 21/41* (2013.01)

(58) Field of Classification Search
CPC ..... H04L 63/08; H04L 63/0815; G06F 21/41; G06F 21/604
USPC ............................................................ 726/1
See application file for complete search history.

(56) References Cited

U.S. PATENT DOCUMENTS

2010/0261452 A1 10/2010 Umezawa et al.

FOREIGN PATENT DOCUMENTS

| CN | 1835439 A | 9/2006 |
| CN | 101409710 A | 4/2009 |

(Continued)

OTHER PUBLICATIONS

English language Search and Examination Report issued Mar. 10, 2014 in Singapore Patent Application No. 2013034046.

(Continued)

*Primary Examiner* — Yin-Chen Shaw
*Assistant Examiner* — John B King
(74) *Attorney, Agent, or Firm* — Oblon, McClelland, Maier & Neustadt, L.L.P.

(57) ABSTRACT

According to one embodiment, the ID provider device stores pieces of policy information for each service provider ID. The ID provider device outputs a policy evaluation request including the user ID used in the log-in processing and the service provider ID in the authentication federation request when the log-in processing is successful. The ID provider device reads the policy information in accordance with the service provider ID in the policy evaluation request. The ID provider device judges whether to permit the transmission of the service data in accordance with whether environmental conditions of the user for the execution of a service conform to the read policy information.

4 Claims, 21 Drawing Sheets

(56) References Cited

FOREIGN PATENT DOCUMENTS

| CN | 101741840 A | 6/2010 |
|---|---|---|
| JP | 2002-123491 | 4/2002 |
| JP | 2008-538247 | 10/2008 |
| JP | 2009-205223 A | 9/2009 |
| JP | 2010-50524 A | 3/2010 |

OTHER PUBLICATIONS

"Federated SSO Authentication Service—Technical Overview" CISCO Systems, Jul. 2009, 13 pages <http://developer.cisco.com/documents/4733862/4734214/Federated+SSO+Authentication+Service.pdf>.

"IBM Tivoli Federated Identity Management and Secure Web Services" IBM, Nov. 2002, 40 Pages< http://www.rv-nrw.de/content/koop/tim/FederatedIdentity_technicalWP.pdf >.

International Preliminary Report on Patentability issued May 23, 2013 in PCT/JP2011/075611 filed on Nov. 7, 2011(English Translation only).

Written Opinion issued Nov. 29, 2011 in PCT/JP2011/075611 (English Translation only).

International Search Report issued on Nov. 29, 2011 for PCT/JP2011/075611 filed on Nov. 7, 2011 with English Translation.

International Written Opinion issued on Nov. 29, 2011 for PCT/JP2011/075611 filed on Nov. 7, 2011.

Scott Cantor et al.; "Assertions and Protocols for the OASIS Security Assertion Markup Language (SAML) V2.0"; OASIS Standard; Mar. 15, 2005; pp. 1-86.

Jeff Bohren et al.; "OASIS Service Provisioning Markup Language (SPML) Version2"; Committee Draft 1.0; Sep. 14, 2005; pp. 1-189.

Combined Chinese Office Action and Search Report issued Nov. 15, 2014 in Application No. 201180044620.X (with English language translation).

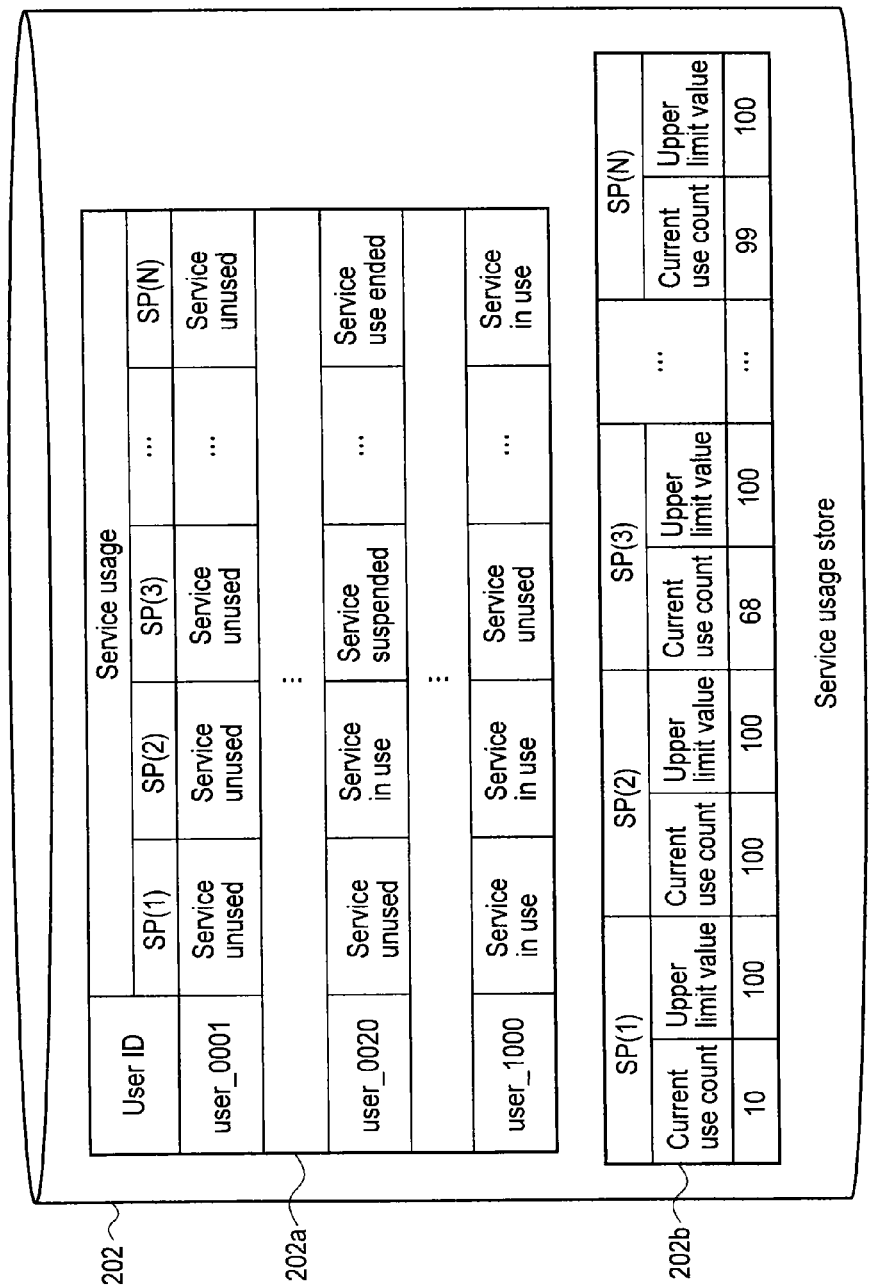
F I G. 3

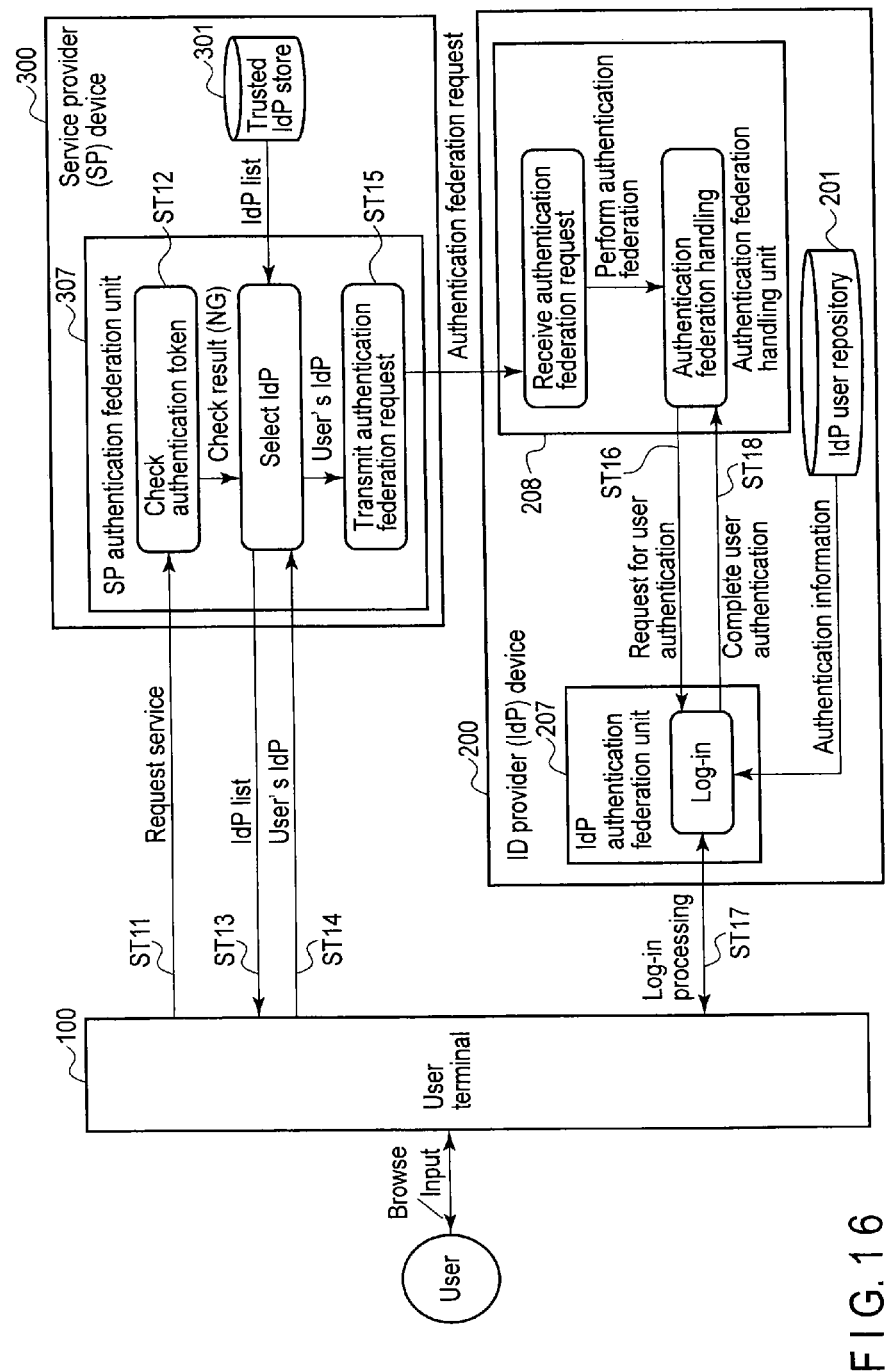
F I G. 16

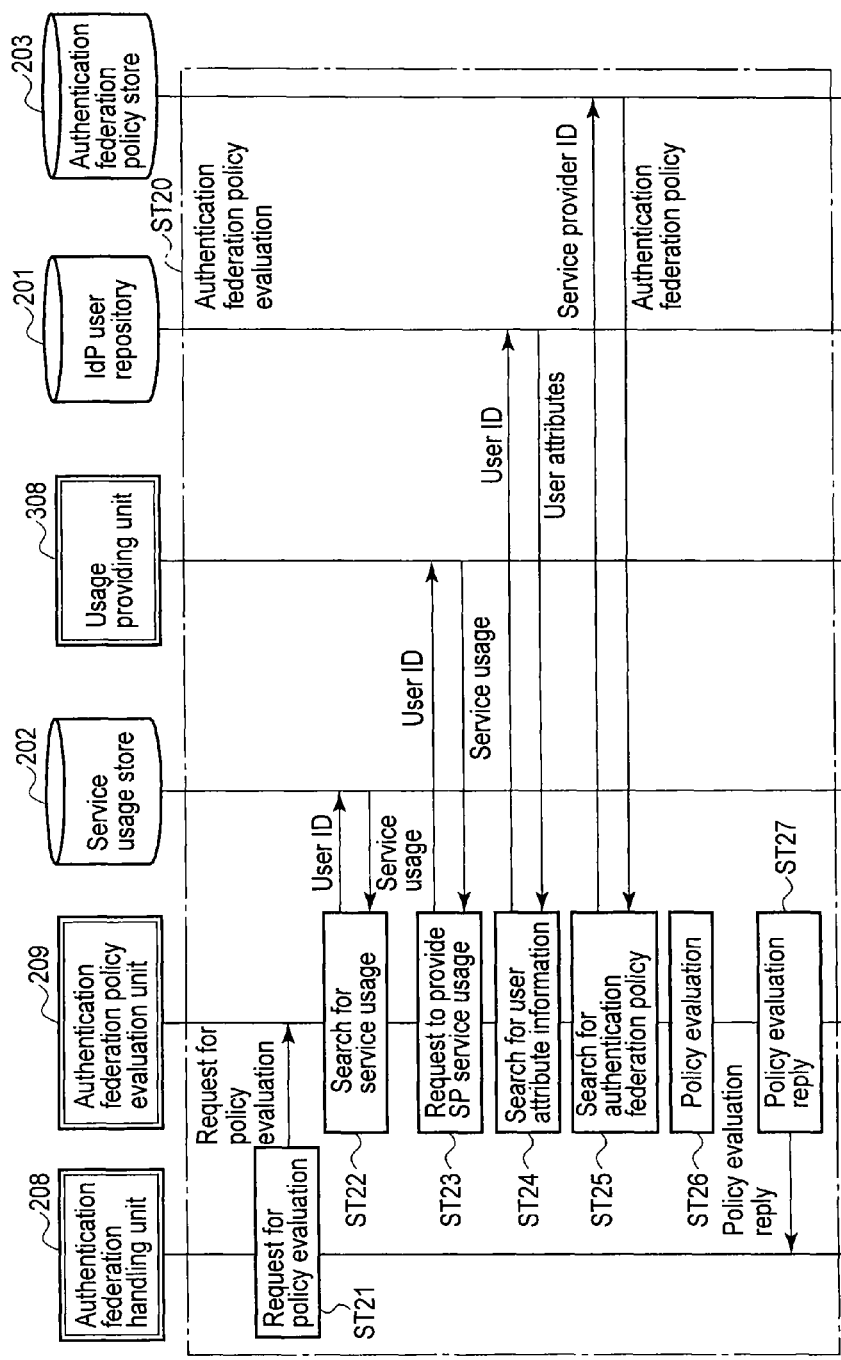
F I G. 17

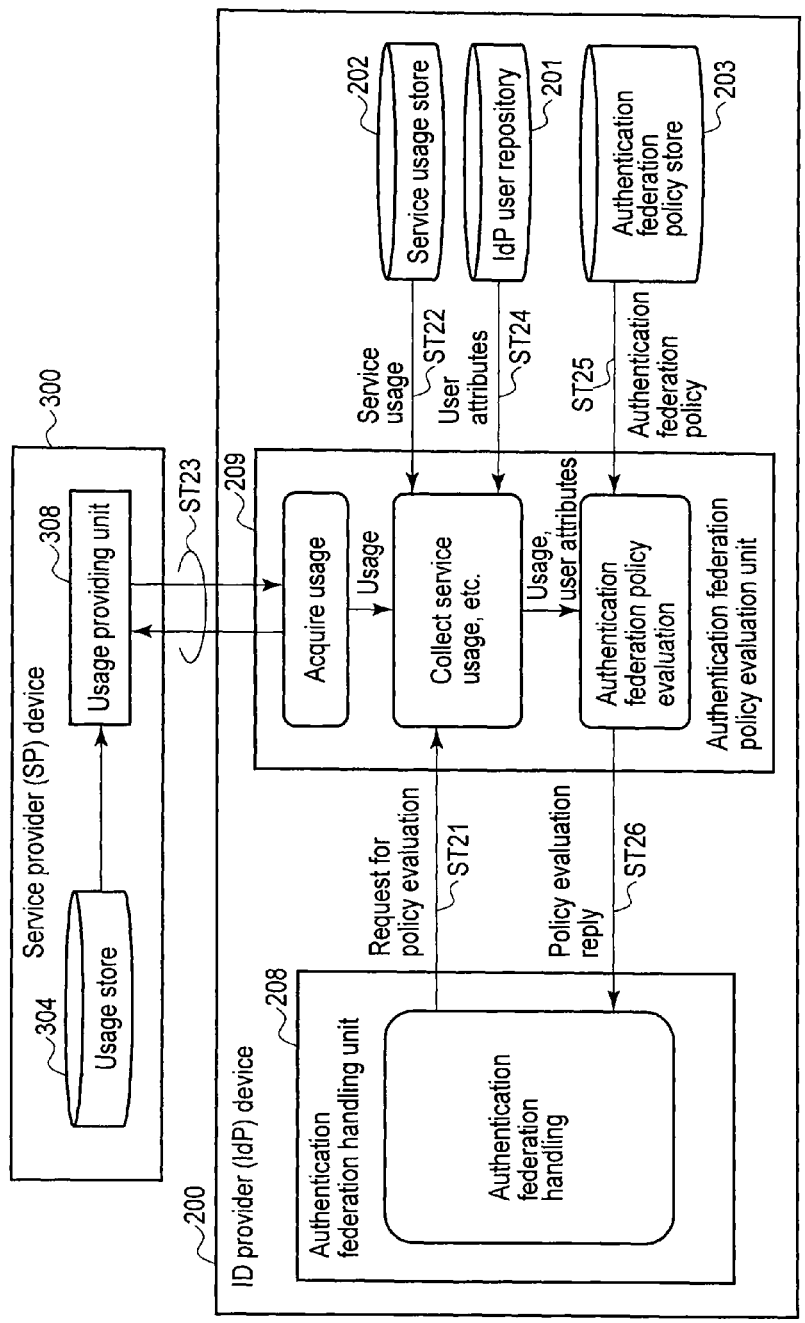
F I G. 18

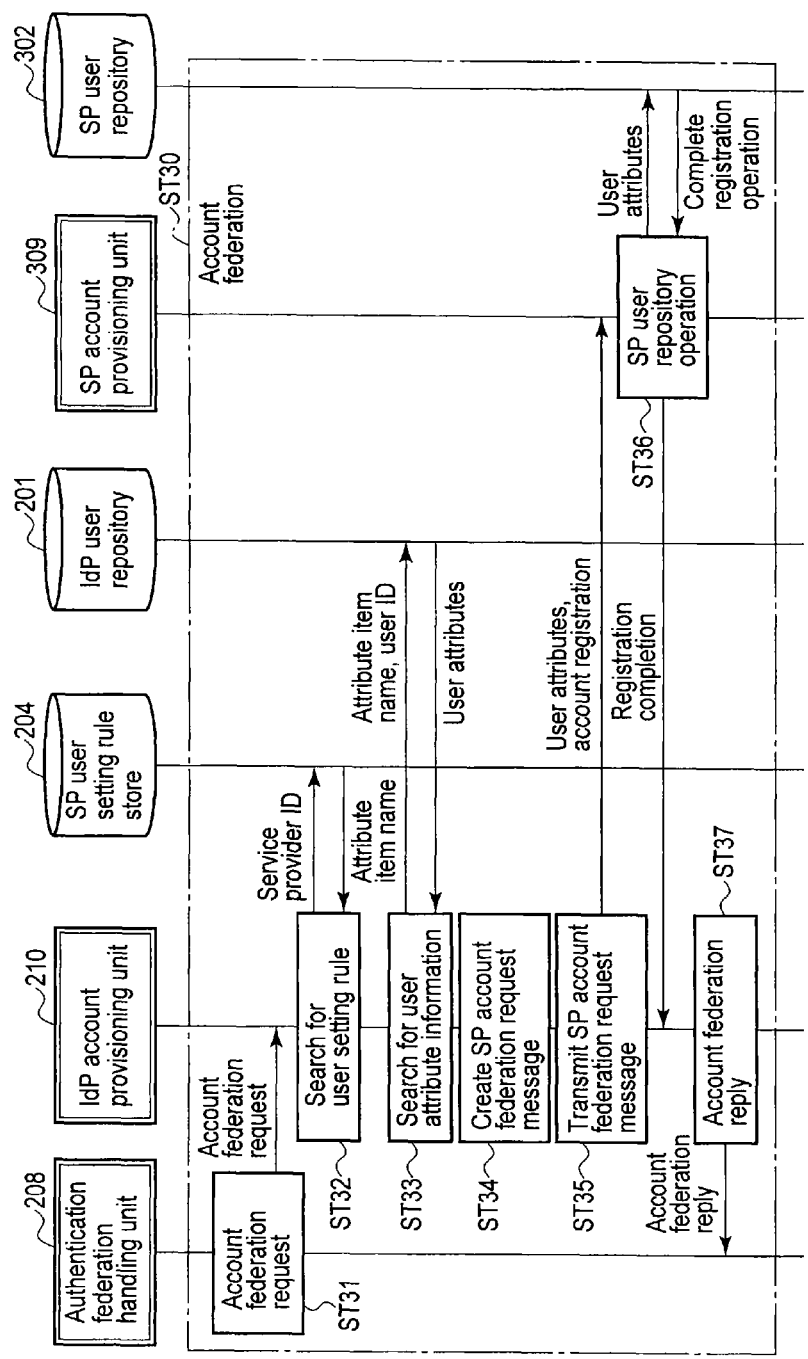
F I G. 19

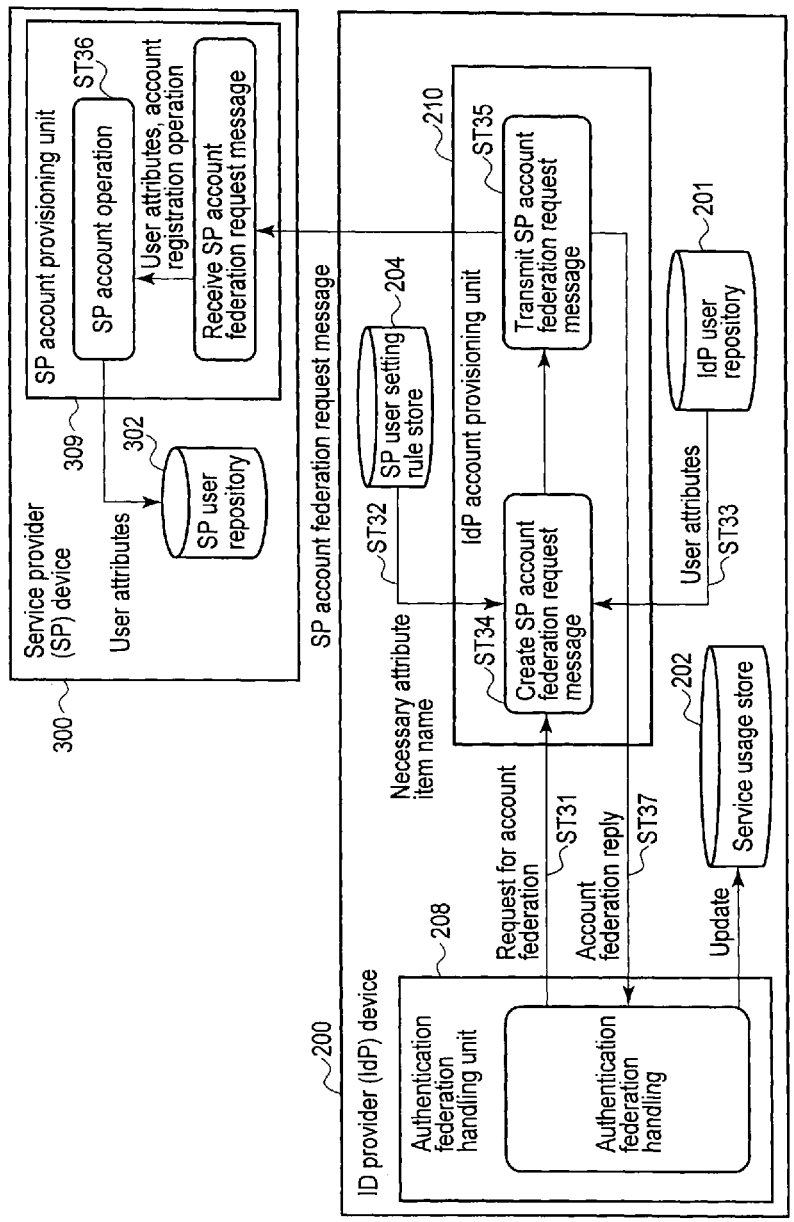
F I G. 20

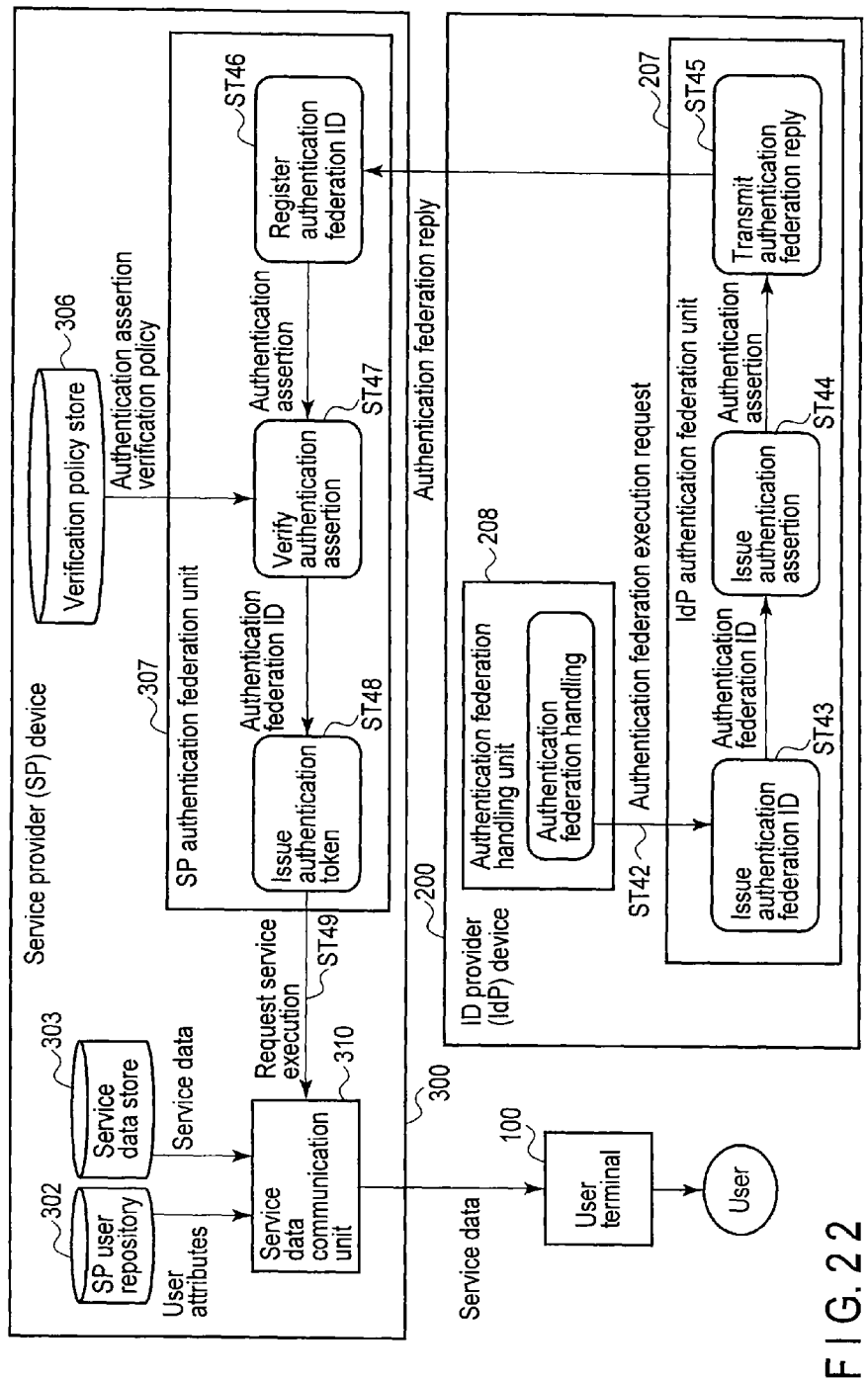
F I G. 22

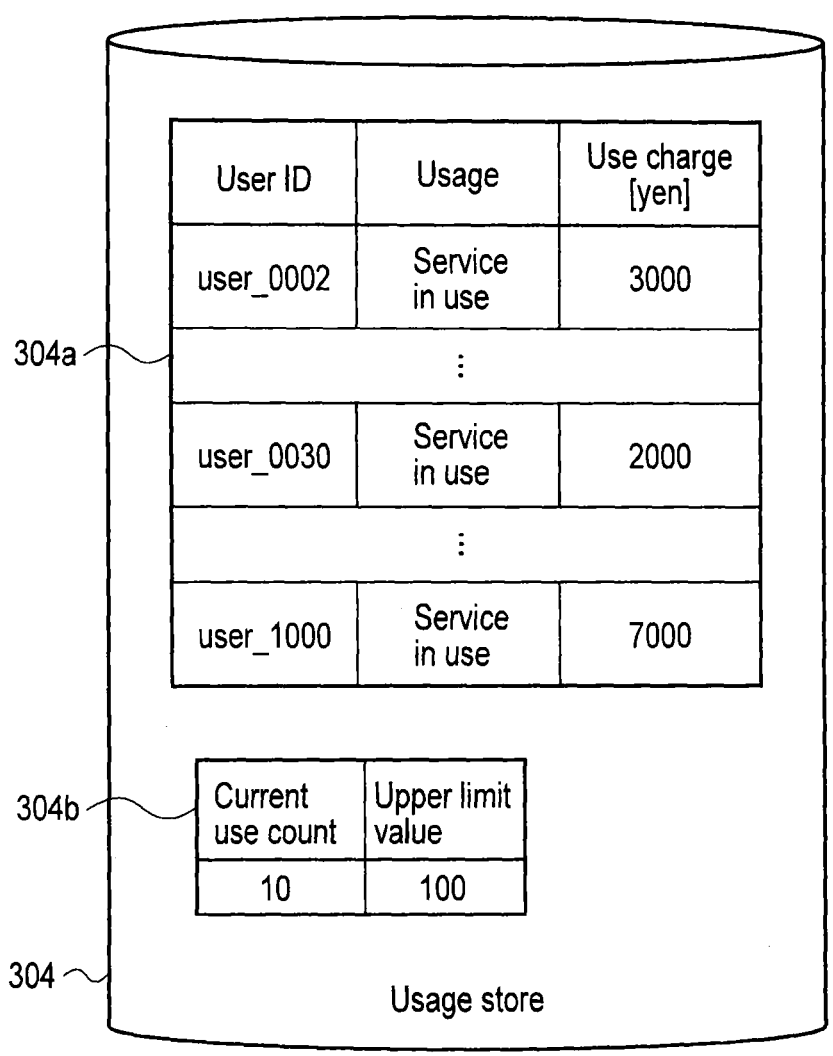
F I G. 2 3

202a — Service usage store

| User ID | Service usage | | | | Use charge [yen] | | |
|---|---|---|---|---|---|---|---|
| | SP(1) | SP(2) | ... | SP(N) | SP(1) | ... | SP(N) |
| user_0001 | Service unused | Service in use | ... | Service unused | 0 | ... | 0 |
| user_0020 | Service in use | ... | ... | Service suspended | 0 | ... | 2000 |
| user_1000 | Service in use | ... | ... | Service unused | 7000 | ... | 0 |

202b

| SP(1) | | SP(2) | | SP(3) | | SP(N) | |
|---|---|---|---|---|---|---|---|
| Current use count | Upper limit value | Current use count | Upper limit value | Current use count | Upper limit value | Current use count | Upper limit value |
| 10 | 100 | 100 | 100 | 68 | 100 | 99 | 100 |

F I G. 2 4

AUTHENTICATION FEDERATION SYSTEM AND ID PROVIDER DEVICE

CROSS REFERENCE TO RELATED APPLICATIONS

This application is a Continuation application of PCT Application No. PCT/JP2011/075611, filed Nov. 7, 2011 and based upon and claiming the benefit of priority from prior Japanese Patent Application No. 2010-250903, filed Nov. 9, 2010, the entire contents of all of which are incorporated herein by reference.

FIELD

Embodiments described herein relate generally to an authentication federation system and an ID provider device.

BACKGROUND

Along with the increasing dependence of society, economy, and living on on-line services, identity management for managing information regarding individuals and organizations is becoming increasingly important. Identity management is a technique that facilitates security and convenience of information regarding individuals and organizations in various services and systems and manages the whole life cycle of an identity from registration to changes and deletion.

Here, the term identity relates to all information that specifies an individual, a group, or an organization/company under certain circumstances, and includes an identifier, credentials, and attributes. The identifier is information to identify the identity, and corresponds to an account or an employee number. The credentials are information that indicates the properness of certain information contents, and are, for example, a password. The attributes are information that characterizes the identity, and indicate, for example, a name, an address, and date of birth.

Single sign-on (hereinafter abbreviated as SSO) is known as an example of a technique that uses such identity management. The SSO is a technique that allows a plurality of applications and services to be used by one authentication procedure. In many cases, the SSO integrates authentications provided in a plurality of applications in a single domain such as an intranet at one company. In this case, the SSO is generally enabled by a method that includes an authentication result in a HTTP cookie so that the authentication result is shared among the applications. Such SSO methods have been independently manufactured by system integration (SI) vendors or middleware vendors as access management products.

Recently, there has been a demand for a SSO among different domains (hereinafter also referred to as cross domains) across the single domain. This is attributed to outsourcing resulting from, for example, the integration or merger of companies, overseas expansion, and software as a service (SaaS) in emerging cloud computing. For example, one advantage of SaaS is its on-demand availability.

However, there have been many problems in sharing an authentication result in the case of cross-domain SSO. There are two main reasons for this. One reason is that the use of the HTTP cookie is limited to the single domain so that an authentication result cannot be shared among domains by the use of the HTTP cookie. The other reason is that the SSO method of an access management product used for each domain varies among vendors so that the simple introduction of the method is impossible and additional measures need to be prepared.

There has been an increasing demand for the standardization of the SSO to solve the aforementioned problems. One example of a standard technique that meets the demand is a security assertion markup language (SAML) developed by a non-profit organization called Organization for the Advancement of Structured Information Standards (OASIS).

SAML is a specification that defines how information regarding authentication, approval, and attributes as well as transmission/receiving procedures is expressed, and is systematically prescribed to enable various package forms depending on purposes. A main body comprises three parts: an identity provider (hereinafter abbreviated as IdP and referred to as an ID provider), a service provider (hereinafter abbreviated as SP and referred to as a service provider), and a user. The service provider trusts an authentication result issued by the ID provider to enable the SSO.

In general, the following two points need to be considered to start SSO based on SAML. The first point is to build a circle of trust through information exchanges and consensus building in business and technical aspects between the service provider and the ID provider. The second point is that one user has an individual account for each service provider and these individual SP accounts are previously federated with the account of the ID provider. The SSO cannot be started before the building of a circle of trust and the previous account federation are prepared.

After these preparations, the SSO is enabled by the following procedures (1) to (6). Here, the procedures for the SSO performed through a Web browser are described.

(1) The user requests the provision of a service from the service provider.

(2) As the service provider has not yet authenticated the user, an authentication request is transmitted to the ID provider via the Web browser of the user.

(3) The ID provider authenticates the user by some means, and creates an authentication assertion. SAML does not define the authentication means, and defines a system that conveys the authentication assertion to the service provider. The authentication assertion includes information on the kind of authentication means and on how credentials are created, in order for the service provider to judge whether an authentication result can be trusted.

(4) The ID provider returns the authentication result including the created authentication assertion to the service provider via the Web browser of the user.

(5) The service provider determines whether to provide the service in accordance with the authentication result from the ID provider.

(6) The user receives the provision of the service from the service provider.

Thus, the SSO based on the SAML allows the user to use a plurality of services by one authentication procedure in the ID provider without additional authentication procedures. At present, to ensure cross-domain interoperability, the middleware vendors which have packaged the individual SSO method carry out the sale of access management products in which an ID provider/service provider function of the SAML is packaged, and the application to business Web services in which the service provider function of the SAML is packaged.

The SSO based on the SAML is only the "use" of the identity which is a part of the whole life cycle of the identity. As described above, when the SSO is started, accounts need to be federated. For the account federation, a technique is required to comprehensively federate the management of the registration, changes, deletion, reissuance, and suspension of the identity between the service provider and the ID provider.

Account provisioning is known as a technique to automate the registration, changes, deletion, reissuance, and suspension of the identity. One such standard technique is a service provisioning markup language (SPML).

In the meantime, there is known a data processing system which dynamically conducts account federation as a part of the SSO from the condition in which the aforementioned account federation is not prepared. In general, an error occurs if the SSO is started without any account of the user registered in the service provider, that is, without account federation.

However, this data processing system can dynamically conduct account federation as a part of the SSO even in the aforementioned condition. Specifically, after the service provider has received a service request from the user, it is checked as to whether the service provider has information sufficient to register the account of the user. After the check, the service provider requests user attributes from the ID provider, and the ID provider provides the desired user attributes to the service provider. Accordingly, the data processing system registers and federates the accounts in the SSO process.

The data processing system described above has no problem in general because the processing demands in requesting and providing user attributes necessary for the registration of the accounts of the individual users are light, and a large volume of previous processing for a large number of users is not required.

However, according to the examination by the present inventor, there is room for improvement, as described below.

When a company uses a service provided by the service provider, an information system (IS) department generally performs account registration and federation for the service provider.

The IS department collectively performs a large volume of previous processing for a large number of users belonging to the company, or conducts a procedure through a flow of approval in accordance with a timing given by a user and then registers and federates the account of the user.

Here, the former previous processing does not require account registration and federation in the process of the SSO, and has therefore no relation to the data processing system.

On the other hand, the latter approval flow is conducted not only through the user but also through many people, including the superior in each layer of the organizational hierarchy to which the user belongs and people in procurement and IS departments. This requires much time and effort. Moreover, the IS department does not collectively perform the previous processing, leading to manual operations that are burdensome, inefficient, and inconvenient. For example, it is not possible to take advantage of the readily available SaaS.

It is therefore preferable that the system which performs account registration and federation in the process of the SSO comprises a seamless structure that determines whether to permit service use in a nonmanual manner.

It is an object of the present invention to provide an authentication federation system and an ID provider device capable of determining whether to permit service use in a nonmanual manner when performing account registration and federation in the process of the SSO.

BRIEF DESCRIPTION OF THE DRAWINGS

FIG. 3 is a schematic diagram illustrating a service usage data store according to the embodiment;

FIG. 16 is a block diagram showing an example of components necessary for processing in the user authentication according to the embodiment;

FIG. 17 is a sequence diagram showing a process flow of authentication federation policy evaluation according to the embodiment;

FIG. 18 is a block diagram showing an example of components necessary for processing in the authentication federation policy evaluation according to the embodiment;

FIG. 19 is a sequence diagram showing a process flow of account federation according to the embodiment;

FIG. 20 is a block diagram showing an example of components necessary for processing in the account federation according to the embodiment;

FIG. 22 is a block diagram showing an example of components necessary for processing in the authentication federation according to the embodiment;

FIG. 23 is a schematic diagram illustrating a usage store according to a second embodiment;

FIG. 24 is a schematic diagram illustrating a service usage store according to the embodiment;

DETAILED DESCRIPTION

Figure 1:
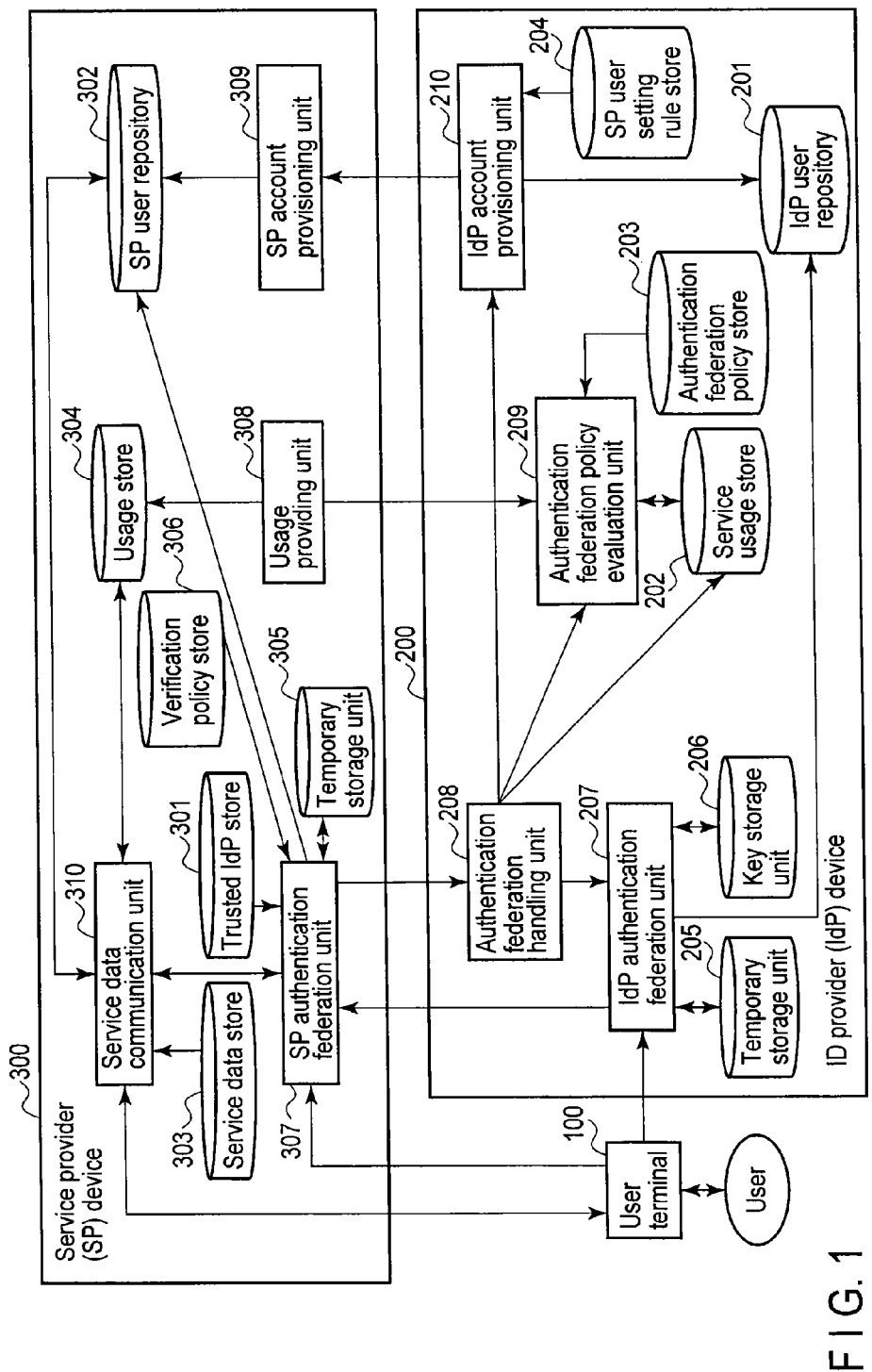
FIG. 1 is a schematic diagram showing an authentication federation system and its peripheral configuration according to a first embodiment.

In general, according to one embodiment, an authentication federation system according to embodiments comprises an ID provider device which is configured to perform log-in processing for a user terminal operable by a user and which has a first memory, and a plurality of service provider devices which are configured to transmit service data to the user terminal when the log-in processing is successful and which have second memories.

A user attribute information storage unit of the ID provider device stores pieces of user attribute information in which item names of user attributes to identify the user are associated with item values of the user attributes. The item names include at least a user ID to identify the user.

A service usage storage unit of the ID provider device stores the user ID, a service provider ID, and service usage in association with one another. The service provider ID serves to identify each of the service provider devices. The service usage indicates a service in use showing that the transmission of the service data is permitted, or a service unused showing that the transmission of the service data is not permitted.

A policy storage unit of the ID provider device stores pieces of policy information for each service provider ID. The policy information indicates a user to whom the service provider device identified by the service provider ID is permitted to transmit the service data.

An item name storage unit of the ID provider device stores some of the item names of the user attributes in the user attribute information in association with the service provider ID.

A key storage unit of the ID provider device stores a signature generating key for the ID provider device.

The ID provider device outputs a user authentication request including the address information for the user terminal in an authentication federation request in response to the authentication federation request which is transmitted from one of the service provider devices and which includes the service provider ID for the service provider device and the address information for the user terminal.

The ID provider device performs log-in processing to transmit a log-in request to the user terminal in accordance with the address information for the user terminal in the output user authentication request, and authenticates a user ID and user authentication information received from the user terminal in accordance with the user ID and the reference information in the user attribute information storage unit.

The ID provider device outputs a policy evaluation request including the user ID used in the log-in processing and the service provider ID in the authentication federation request when the log-in processing is successful.

The ID provider device reads the user attribute information from the user attribute information storage unit in accordance with the user ID in the output policy evaluation request.

The ID provider device reads the policy information from the policy storage unit in accordance with the service provider ID in the output policy evaluation request.

A transmission permission judging unit of the ID provider device judges whether to permit the transmission of the service data in accordance with whether the read user attribute information, the kind of service to be used by the user, the operation to be performed for a service by the user, and environmental conditions of the user for the execution of a service conform to the read policy information and in accordance with whether the use charge in the received use charge reply conforms to the upper limit value of the use charge indicated in the read policy information.

The ID provider device outputs a policy evaluation reply including the judgment result to a transmission source of the policy evaluation request.

The ID provider device outputs an account federation request including the user ID and the service provider ID in the policy evaluation request when the judgment result in the policy evaluation reply indicates permission.

The ID provider device reads some of the item names of the user attributes from the item name storage unit in accordance with the service provider ID in the output account federation request.

The ID provider device acquires user attribute partial information comprising item names corresponding to some of the item names and item values associated with the item names in the user attribute information including the user ID corresponding to the user ID in the user attribute information storage unit in accordance with some of the item names that have been read and the user ID in the account federation request.

The ID provider device adds an account registration instruction to the acquired user attribute partial information to create an account federation request message.

The ID provider device transmits the account federation request message to the service provider device which is a transmission source of the account federation request.

The ID provider device outputs an account federation reply indicating registration completion when the service provider device which is a transmission destination of the account federation request message reports the registration completion including the service provider ID of the service provider device and the user ID in the user attribute partial information.

The ID provider device updates the service usage in the service usage storage unit from the service unused to the service in use in accordance with the service provider ID and the user ID included in the registration completion in the output account federation reply.

The ID provider device outputs an authentication federation execution request including the service provider ID and the user ID included in the registration completion in the output account federation reply.

The ID provider device issues an authentication federation ID shared between the service provider device identified by the service provider ID in an authentication federation execution request and the ID provider device in response to the authentication federation execution request, and writes the authentication federation ID and the user ID in the authentication federation execution request into the first memory in association with each other.

The ID provider device generates a digital signature based on the signature generating key for an assertion body including the issued authentication federation ID and the name of an authentication method for the log-in processing, and creates an authentication assertion including the assertion body and the digital signature.

The ID provider device transmits an authentication federation reply including the created authentication assertion to the service provider device which is a transmission source of the authentication federation request.

A user attribute partial information storage unit of each of the service provider devices stores the user attribute partial information and an SP-side user ID in association with each other. Some of the item names and item values of the user attributes in the user attribute information in the user attribute information storage unit are associated with one another in the user attribute partial information. The SP-side user ID serves to identify the user in the service provider device.

A verification policy storage unit of each of the service provider devices stores an authentication assertion verification policy including the name of an authentication method for the log-in processing to permit the transmission of the service data when the log-in processing is successful, and a signature verification key corresponding to the signature generating key.

Each service data storage unit of each service provider device stores the service data.

Each of the service provider devices judges whether a service request includes the authentication token in response to the service request from the user terminal, and transmits the authentication token and the service data in the service data storage unit to the user terminal when the service request includes the authentication token, or transmits an authentication federation request including the service provider ID of the service provider device and the address information for the user terminal to the ID provider device when the service request does not include the authentication token.

Each of the service provider devices issues a new SP-side user ID when receiving the account federation request message, and registers the issued SP-side user ID and the user attribute partial information in the account federation request message in the user attribute partial information storage unit in association with each other.

Each of the service provider devices reports, after the registration, registration completion including the user ID in the registered user attribute partial information and the service provider ID in the service provider device to the ID provider device which is a transmission source of the account federation request message.

Each of the service provider devices extracts an authentication federation ID from the authentication assertion in the authentication federation reply in response to the authentication federation reply from the ID provider device, and writes the extracted authentication federation ID and the user ID in the registered user attribute partial information into the second memory in association with each other.

Each of the service provider devices verifies the authentication method name and the digital signature in the authentication assertion in accordance with the authentication method name and the signature verification key in the authentication assertion verification policy.

Each of the service provider devices issues an authentication token and writes the authentication token into the second memory in association with the authentication federation ID when all the verification results are proper.

Each of the service provider devices outputs a service execution request including the written authentication token and the user ID which is associated with the authentication token in the second memory via the authentication federation ID.

Each of the service provider devices transmits the authentication token in the service execution request and the service data in the service data storage unit in accordance with the output service execution request.

Hereinafter, embodiments will be described with reference to the drawings. The embodiments are based on the assumption that a circle of trust is already established between an ID provider and a service provider, that a user belongs to an organization of the ID provider, and that an authentication federation policy is previously defined. Each device can be embodied by a hardware configuration, or a combinational configuration of a hardware resource and software. As the software of the combinational configuration, a program which is previously installed in a computer of a corresponding device from a network or a storage medium and which enables the functions of the corresponding device is used.

First Embodiment

FIG. 1 is a schematic diagram showing an authentication federation system and its peripheral configuration according to the first embodiment. FIG. 2 to FIG. 13 are schematic diagrams illustrating repositories and stores or storage units according to the embodiment. This authentication federation system comprises an ID provider device 200 which can perform log-in processing for a user terminal 100 operable by a user, and a service provider device 300 which can transmit service data to the user terminal 100 when the log-in processing is successful. Although there area multiple service provider devices 300, one service provider device 300 is only shown here.

Here, the user terminal 100 has normal computer functions to be able to communicate with the ID provider device 200 and each of the service provider devices 300. For example, the user terminal 100 has a function of transmitting a service request to the service provider device 300 in response to a user operation, a function of performing log-in processing between the ID provider device 200 and the user terminal 100, a function of receiving service data from the service provider device 300, and a function of reproducing the received service data when a CPU executes a service use application program previously stored in a memory.

The ID provider device 200 manages the identities of users. The ID provider device 200 comprises an IdP user repository 201, a service usage store 202, an authentication federation policy store 203, an SP user setting rule store 204, a temporary storage unit 205, a key storage unit 206, an IdP authentication federation unit 207, an authentication federation handling unit 208, an authentication federation policy evaluation unit 209, and an IdP account provisioning unit 210.

Figure 2:
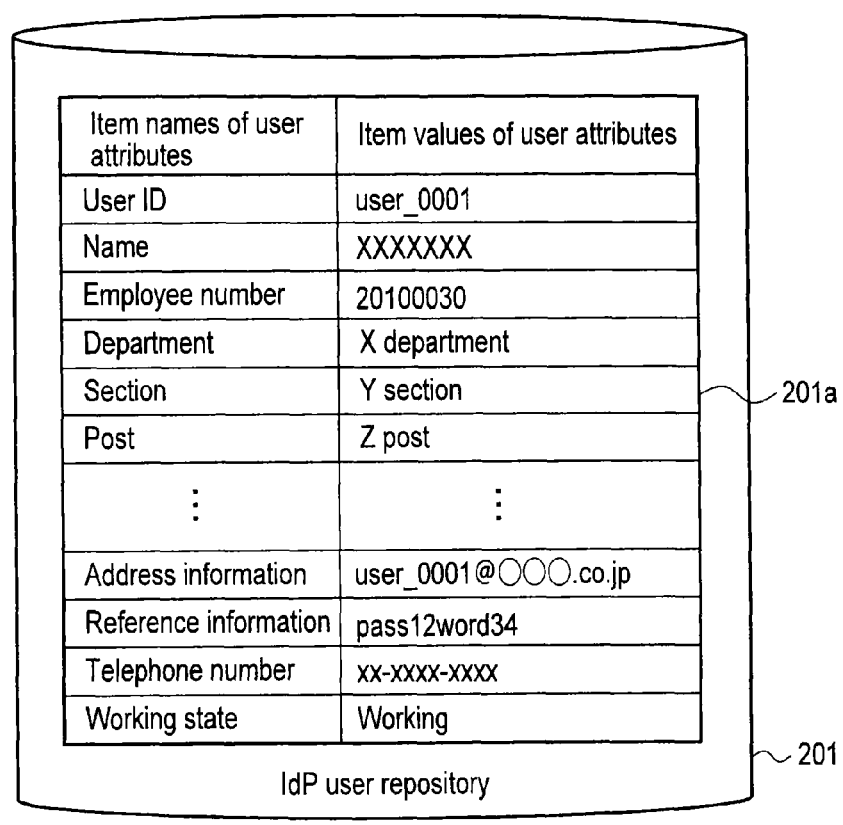
FIG. 2 is a schematic diagram illustrating an IdP user repository according to the embodiment.

Here, identity information (hereinafter referred to as "user attribute information") regarding the user of an organization in which the ID provider device 200 is located is stored in the IdP user repository 201. Specifically, pieces of user attribute information 201a are stored in the IdP user repository (user attribute information storage unit) 201. As shown in FIG. 2, item names of user attributes to identify the user are associated with item values of the user attributes in the user attribute information 201a. The item names include a user ID to identify the user, the name of the user, the position of the user, the post of the user, address information for the user terminal, and reference information which is referred to during the log-in processing of the user.

The user attribute information 201a is an aggregation of information that characterizes individual information. Examples of the user attribute information 201a include the name of the user, the position of the user, the post of the user, address information for the user terminal, and reference information which is referred to during the log-in processing of the user. However, the user attribute information 201a is not limited thereto, and may further include any item name and item place; for example, a telephone number and working state. Although a password is used as the reference information which is referred to during the log-in processing of the user in the present embodiment, the reference information is not limited thereto and may be, for example, biometric authentication information such as the fingerprint of the user.

The service usage store 202 is referred to from the authentication federation policy evaluation unit 209, and the usage of a service is stored therein. Specifically, as shown in FIG. 3, a user use management table 202a and a use count management table 202b are stored in the service usage store (service usage storage unit) 202. The user ID, a service provider ID (SP(1) to SP(N)), and service usage are written in the user use management table 202a in association with one another. The service provider ID serves to identify each of the service provider devices 300. The service usage indicates a service in use showing that the transmission of the service data is permitted, or a service unused showing that the transmission of the service data is not permitted. The service usage is not limited to the service in use and the service unused, and may include, for example, a service suspended that responds to a suspension request received from the user terminal 100, and/or service use ended that responds to a use termination request received from the user terminal 100. When the current use count has exceeded an upper limit value, the service use ended may include a case in which the ID provider device 200 has invalidated the use of an idle user. Moreover, as shown in FIG. 3, a use count and an upper limit value of the use count are written in the use count management table 202b in association with each other. The use count indicates the number of used services shown by the service usage in the user use management table 202a.

Figure 4:
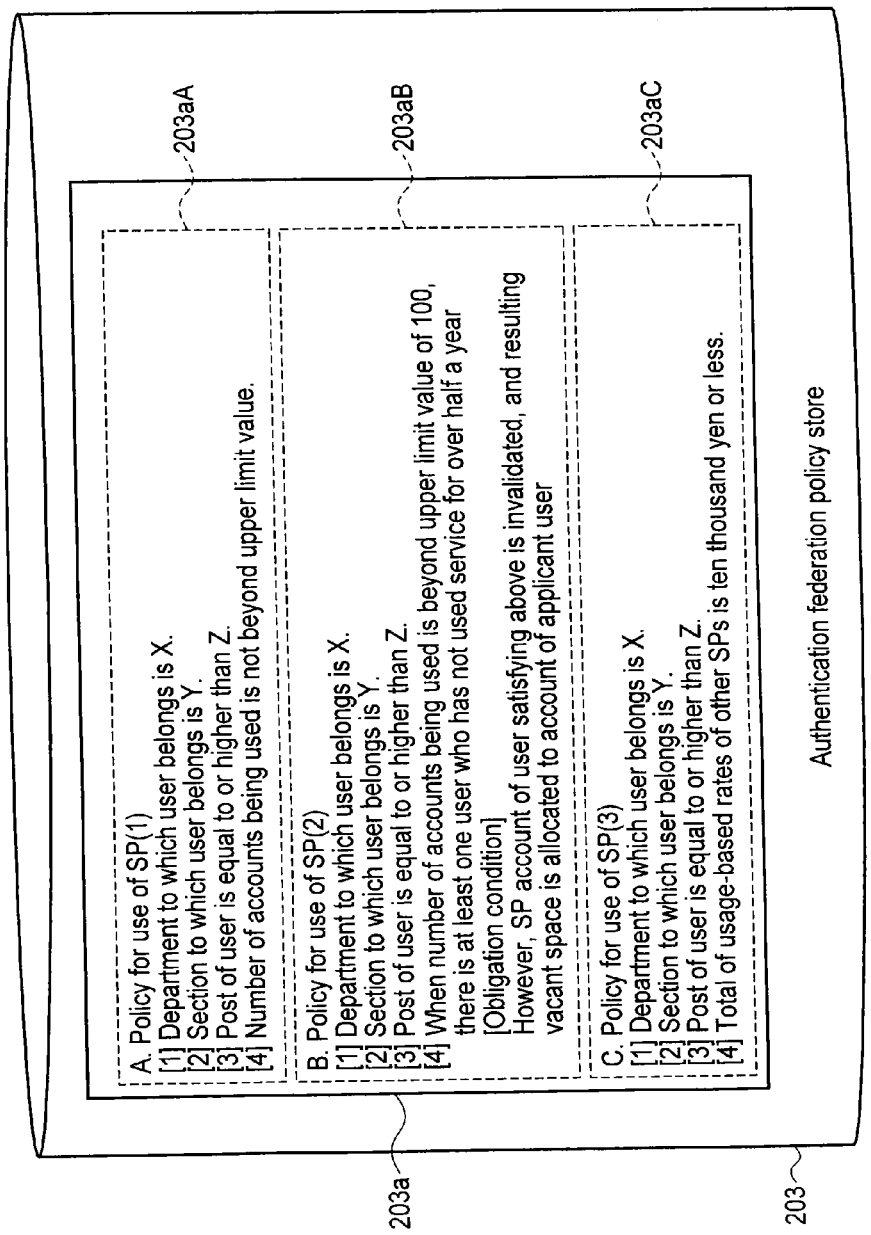
FIG. 4 is a schematic diagram illustrating an authentication federation policy store according to the embodiment.

The authentication federation policy store 203 is referred to from the authentication federation policy evaluation unit 209, and an authentication federation policy is stored therein. Specifically, as shown in FIG. 4, a plurality of authentication federation policies (policy information) 203a (203aA, 203aB, 203aC, ...) are stored in the authentication federation policy store (policy storage unit) 203 for each service provider ID. The authentication federation policies 203a indicate the positions and posts of the users to whom the service provider device 300 identified by the service provider ID is permitted to transmit the service data.

The authentication federation policies 203a may further include a dynamic policy (e.g., [4] of C in FIG. 4) for the number of services used and the total of usage-based rates, in addition to static policies (e.g., [1] to [3] of A to C in FIG. 4) for the positions and posts of the users.

Here, the policy generally indicates an aggregation of accessibility conditions that define who (subject) can perform which operation (action) for which system resource (resource) (i.e., permission or rejection). An environmental condition and an obligation condition are also optionally defined.

For example, regarding each element of the aforementioned policy, a name, a post, or a position corresponds to the "subject". A service provider ID or URL corresponds to the "resource". The start of use or resumption of use corresponds to the "action". The IP address of the user making a demand and the period or time that permits access correspond to the "environmental condition". The "obligation condition" is the work imposed by the authentication federation handling unit 208 in performing authentication federation in response to the result of policy (access permitting condition) evaluation. For example, an instruction is issued to 'permit the request for the "registration of a new user" but ensure the "deletion of the ID of the idler"' (e.g., [obligation condition] of [4] of B in FIG. 4).

Figure 5:
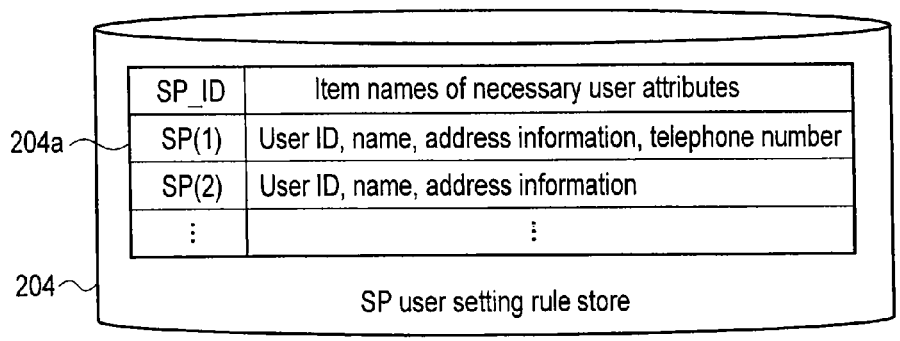
FIG. 5 is a schematic diagram illustrating an SP user setting rule store according to the embodiment.

As shown in FIG. 5, a user setting rule 204a is stored in the SP user setting rule store (item name storage unit) 204. Some of the item names of the user attributes in the user attribute information 201a stored in the IdP user repository 201 are written in the user setting rule 204a in association with the service provider ID.

Figure 6:
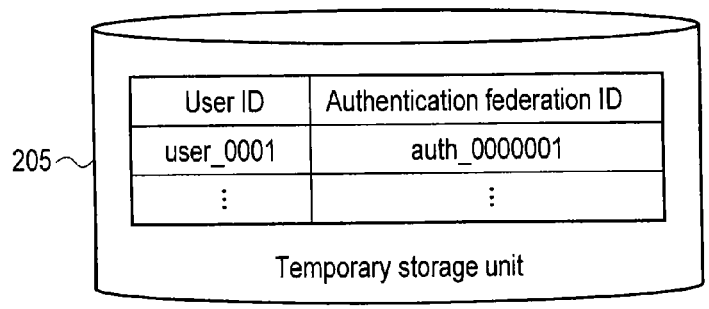
FIG. 6 is a schematic diagram illustrating a temporary storage unit according to the embodiment.

The temporary storage unit (first memory) 205 is a temporary memory such as a RAM. For example, as shown in FIG. 6, an authentication federation ID and a user ID are stored in the temporary storage unit 205 in association with each other.

A signature generating key for the ID provider device 200 is stored in the key storage unit 206. As the signature generating key, it is possible to use, for example, a secret key of a pair of public and secret keys in a public key encryption method.

The IdP authentication federation unit 207 has a single sign-on ID provider function. Specifically, the IdP authentication federation unit 207 has, for example, the following functions (f207-1) to (f207-4):

(f207-1) A function to perform log-in processing to transmit a log-in request to the user terminal 100 in accordance with address information for the user terminal 100 in a user authentication request output from the authentication federation handling unit 208, and authenticate a user ID and user authentication information received from the user terminal 100 in accordance with the user ID and the reference information in the IdP user repository 201.

(f207-2) A function to issue an authentication federation ID shared between the service provider device 300 identified by the service provider ID in an authentication federation execution request and the ID provider device 200 in response to the authentication federation execution request from the authentication federation handling unit 208, and write the authentication federation ID and the user ID in the authentication federation execution request into the temporary storage unit 205 in association with each other.

Figure 7:
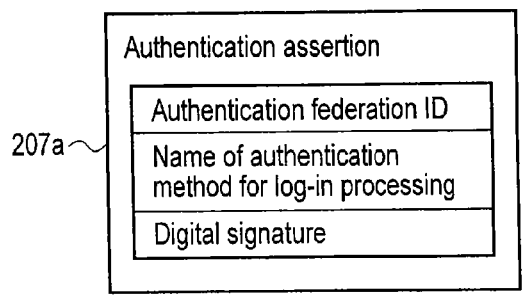
FIG. 7 is a schematic diagram illustrating an authentication assertion according to the embodiment.

(f207-3) A function to generate a digital signature based on the signature generating key in the key storage unit 206 for an assertion body including the issued authentication federation ID and the name of an authentication method for the log-in processing, and create an authentication assertion 207a including the assertion body and the digital signature, as shown in FIG. 7.

(f207-4) A function to transmit an authentication federation reply including the created authentication assertion 207a to the service provider device 300 which is a transmission source of an authentication federation request.

After receiving the authentication federation request from the service provider device 300, the authentication federation handling unit 208 handles a series of processing comprising policy evaluation processing, account federation processing, and ID provider authentication federation processing. The authentication federation handling unit 208 has, for example, the following functions (f208-1) to (f208-5):

(f208-1) A function to output a user authentication request including the address information for the user terminal 100 in an authentication federation request to the IdP authentication federation unit 207 in response to the authentication federation request which is transmitted from one of the service provider devices 300 and which includes the service provider ID for the service provider device 300 and the address information for the user terminal 100.

(f208-2) A function to output a policy evaluation request including the user ID used in the log-in processing and the service provider ID in the authentication federation request to the authentication federation policy evaluation unit 209 when the log-in processing by the IdP authentication federation unit 207 is successful.

(f208-3) A function to output an account federation request including the user ID and the service provider ID in the policy evaluation request to the IdP account provisioning unit 210 when a judgment result in a policy evaluation reply received from the authentication federation policy evaluation unit 209 indicates permission.

(f208-4) A function to update the service usage in the service usage store 202 from the service unused to the service in use in accordance with the service provider ID and the user ID included in registration completion in an output account federation reply.

(f208-5) A function to output, to the IdP authentication federation unit 207, an authentication federation execution request including the service provider ID and the user ID included in the registration completion in the account federation reply output from the IdP account provisioning unit 210.

The authentication federation policy evaluation unit 209 performs policy evaluation in accordance with the previously defined authentication federation policies 203a and the service usage in response to the policy evaluation request from the authentication federation handling unit 208. The authentication federation policy evaluation unit 209 has, for example, the following functions (f209-1) to (f209-4):

(f209-1) A function to read the user attribute information 201a from the IdP user repository 201 in accordance with the user ID in the policy evaluation request output from the authentication federation handling unit 208.

(f209-2) A function to read the authentication federation policies (policy information) 203a from the authentication federation policy store 203 in accordance with the service provider ID in the policy evaluation request output from the authentication federation handling unit 208.

(f209-3) A transmission permission judgment function to judge whether to permit the transmission of the service data in accordance with whether the position and post in the read user attribute information 201a conform to the position and post indicated in the read authentication federation policy 203a.

(f209-4) A function to output the policy evaluation reply including the judgment result to the authentication federation handling unit 208 which is a transmission source of the policy evaluation request.

The IdP account provisioning unit 210 executes account provisioning for the service provider device 300 in response to the account federation request from the authentication federation handling unit 208. The IdP account provisioning unit 210 has, for example, the following functions (f210-1) to (f210-5):

(f210-1) A function to read some of the item names of the user attributes from the SP user setting rule store 204 in accordance with the service provider ID in the output account federation request.

(f210-2) A function to acquire user attribute partial information comprising item names corresponding to some of the item names and item values associated with the item names in the user attribute information 201a including the user ID corresponding to the user ID in the IdP user repository 201 in accordance with some of the item names that have been read and the user ID in the account federation request.

(f210-3) A function to add an account registration instruction to the acquired user attribute partial information to create an account federation request message.

(f210-4) A function to transmit the account federation request message to the service provider device 300 which is a transmission source of the account federation request.

(f210-5) A function to output an account federation reply indicating the registration completion to the authentication federation handling unit 208 when the service provider device 300 which is a transmission destination of the account federation request message reports the registration completion including the service provider ID of the service provider device and the user ID in the user attribute partial information.

Meanwhile, the service provider device 300 provides services used by the user, and comprises a trusted IdP store 301, an SP user repository 302, a service data store 303, a usage store 304, a temporary storage unit 305, a verification policy store 306, an SP authentication federation unit 307, a usage providing unit 308, an SP account provisioning unit 309, and a service data communication unit 310.

Figure 8:
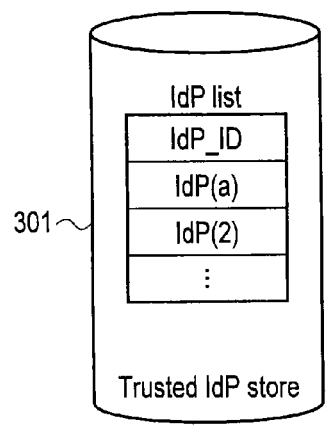
FIG. 8 is a schematic diagram illustrating a trusted IdP store according to the embodiment.

As shown in FIG. 8, an IdP list (ID provider list) 301a comprising a list of ID providers ID to identify the ID provider device 200 is stored in the trusted IdP store 301.

Figure 9:
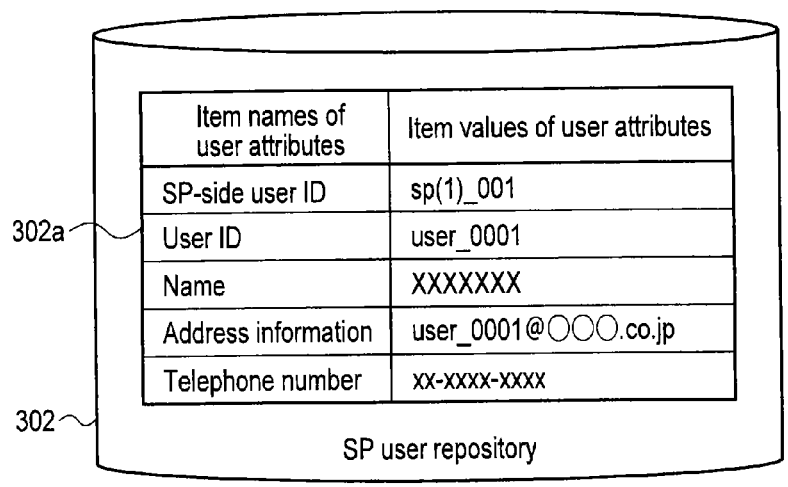
FIG. 9 is a schematic diagram illustrating an SP user repository according to the embodiment.

Identity information for the user using service data transmitted by the service data communication unit 310 is stored in the SP user repository 302. Specifically, as shown in FIG. 9, user attribute partial information 302a and an SP-side user ID are stored in the SP user repository (user attribute partial information storage unit) 302 in association with each other. In the user attribute partial information 302a, some of the item names and item values of the user attributes in the user attribute information 201a of the IdP user repository 201 are associated with one another. The SP-side user ID serves to identify the user in the service provider device 300.

Figure 10:
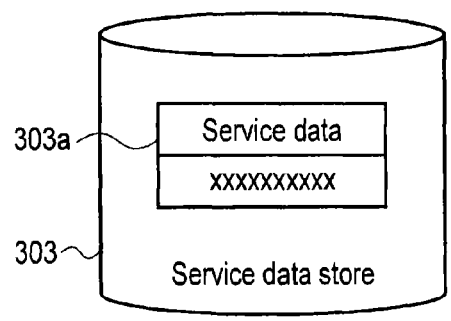
FIG. 10 is a schematic diagram illustrating a service data store according to the embodiment.

As shown in FIG. 10, service data 303a is stored in the service data store 303. The service data 303a is any data transmitted to the user terminal 100 as an object of service provision (service data transmission) by the service provider device 300.

Figure 11:
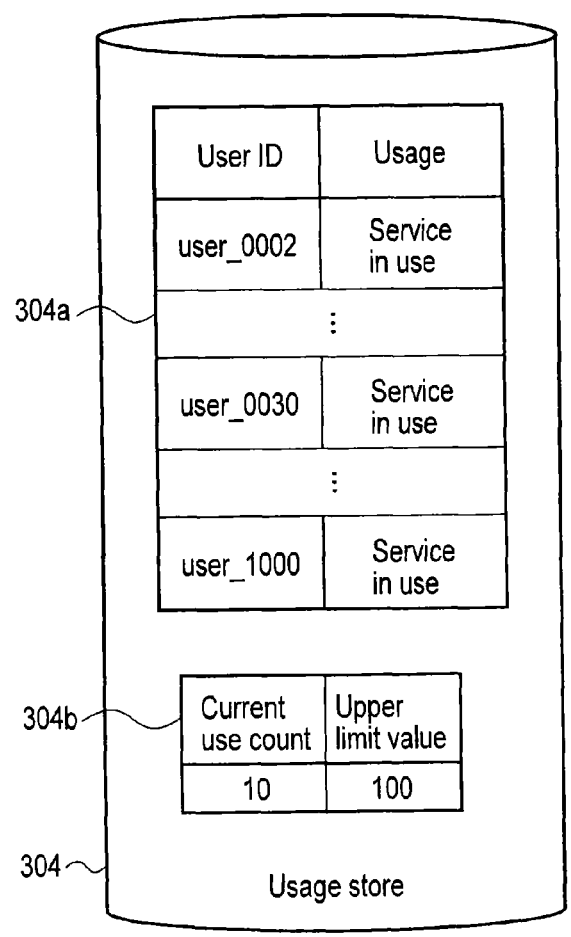
FIG. 11 is a schematic diagram illustrating a usage store according to the embodiment.

As shown in FIG. 11, a user use management table 304a and a use count management table 304b are stored in the usage store 304. The user ID and service usage are written in the user use management table 304a in association with each other. The service usage indicates a service in use showing that the transmission of the service data 303a is permitted, or a service unused showing that the transmission of the service data 303a is not permitted. A use count and an upper limit value of the use count are written in the use count management table 304b in association with each other. The use count indicates the number of used services shown by the service usage in the user management table.

Figure 12:
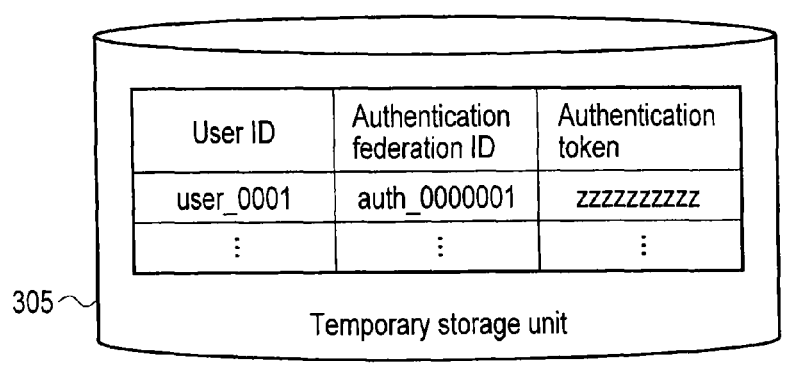
FIG. 12 is a schematic diagram illustrating a temporary storage unit according to the embodiment.

The temporary storage unit (second memory) 305 is a temporary memory such as a RAM. For example, as shown in FIG. 12, an authentication federation ID extracted from the authentication assertion 207a, the user ID in the registered user attribute partial information 302a, and an issued authentication token are stored in the temporary storage unit 305 in association with one another.

Figure 13:
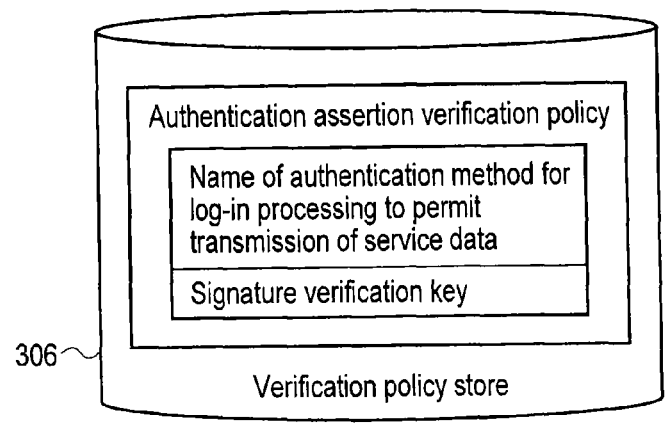
FIG. 13 is a schematic diagram illustrating a verification policy store according to the embodiment.

As shown in FIG. 13, an authentication assertion verification policy is stored in the verification policy store 306. The authentication assertion verification policy includes the name of an authentication method for the log-in processing to permit the transmission of the service data 303a when the log-in processing is successful, and a signature verification key corresponding to the signature generating key for the ID provider device 200. As the signature verification key, it is possible to use, for example, a public key of a pair of public and secret keys in the public key encryption method.

The SP authentication federation unit 307 has a single sign-on service provider function. Specifically, the SP authentication federation unit 307 has, for example, the following functions (f307-1) to (f307-5):

(f307-1) A function to judge whether a service request includes the authentication token in response to the service request from the user terminal 100, and transmit the authentication token and the service data 303a in the service data store 303 to the user terminal 100 when the service request includes the authentication token, or transmit an authentication federation request including the service provider ID of the service provider device 300 and the address information for the user terminal 100 to the ID provider device 200 when the service request does not include the authentication token.

(f307-2) A function to extract an authentication federation ID from the authentication assertion 207a in the authentication federation reply in response to the authentication federation reply from the ID provider device 200, and write the extracted authentication federation ID and the user ID in the registered user attribute partial information 302a into the temporary storage unit 305 in association with each other.

(f307-3) A verification function to verify the authentication method name and the digital signature in the authentication assertion 207a in accordance with the authentication method name and the signature verification key in the authentication assertion verification policy in the verification policy store 306.

(f307-4) A function to issue an authentication token and write the authentication token into the temporary storage unit 305 in association with the authentication federation ID when all the verification results are proper.

(f307-5) A function to output, to the service data communication unit 310, a service execution request including the written authentication token and the user ID which is associated with the authentication token in the temporary storage unit 305 via the authentication federation ID.

The usage providing unit 308 searches the usage store 304 in accordance with the user ID included in a usage transmission request and transmit service usage obtained by the search in response to the usage transmission request from the authentication federation policy evaluation unit 209 of the ID provider device 200.

The SP account provisioning unit 309 performs account provisioning for the SP user repository 302 in accordance with an account provisioning request (account federation request message) received from the IdP account provisioning unit 210 of the ID provider device 200. Specifically, the SP account provisioning unit 309 has, for example, the following functions (f309-1) and (f309-2):

(f309-1) A function to issue a new SP-side user ID when receiving an account federation request message from the IdP account provisioning unit 210 of the ID provider device 200, and register the issued SP-side user ID and the user attribute partial information 302*a* in the account federation request message in the SP user repository 302 in association with each other.

(f309-2) A function to report, after the registration, registration completion including the user ID in the registered user attribute partial information 302*a* and the service provider ID in the service provider device 300 to the ID provider device 200 which is a transmission source of the account federation request message.

The service data communication unit 310 has a function to transmit the authentication token in the service execution request and the service data 303*a* in the service data store 303 to the user terminal 100 in accordance with the service execution request output from the SP authentication federation unit 307.

Next, the operation of the authentication federation system having the above configuration is described with reference to FIG. 14 to FIG. 22. The following explanation is in a system environment that enables the SSO between the ID provider device 200 and the service provider device 300, and starts with a condition in which the account of the user belonging to an organization of an ID provider is not registered in the service provider device 300. In this condition, when the user has made a service request, whether the ID provider device 200 satisfies the authentication federation policies 203*a* is judged. If the ID provider device 200 satisfies the authentication federation policies 203*a*, the account of the user is registered in the service provider device 300. As a result, the SSO between the ID provider device 200 and the service provider device 300 is performed, and the service data 303*a* is transmitted from the service provider device 300. An example of this typical processing is described.

Figure 14:
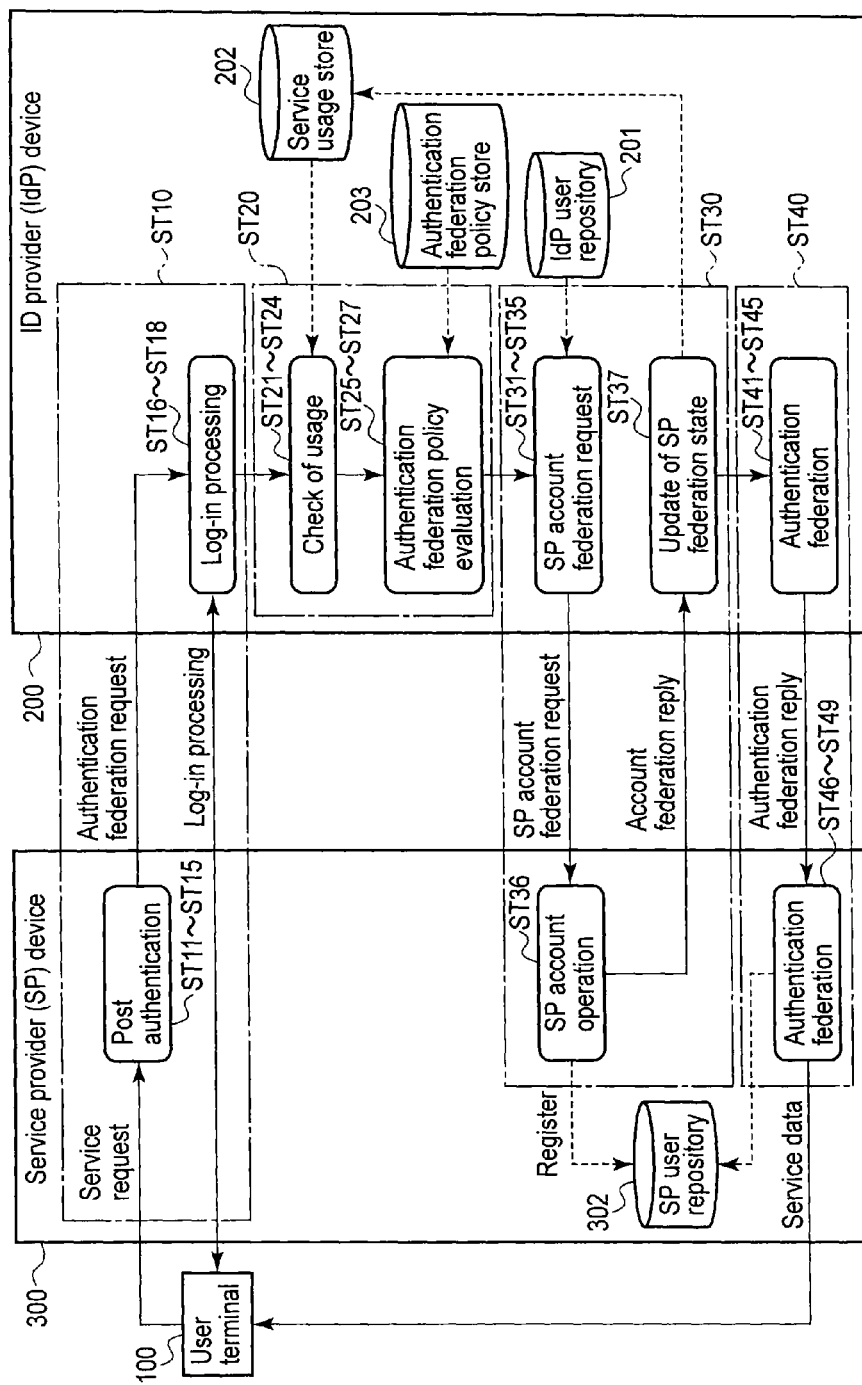
FIG. 14 is a schematic diagram showing an overview of overall operation according to the embodiment.
Figure 15:
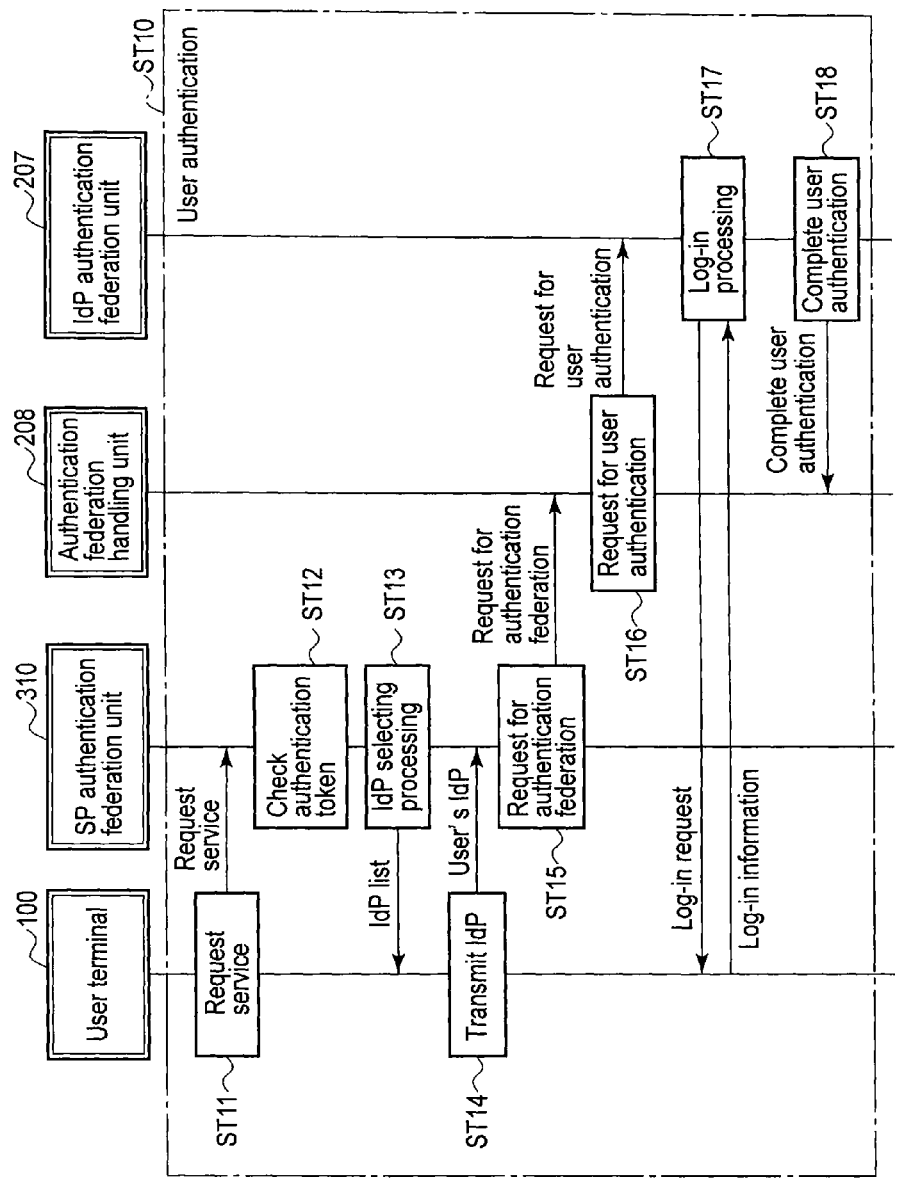
FIG. 15 is a sequence diagram showing a process flow of user authentication according to the embodiment.
Figure 21:
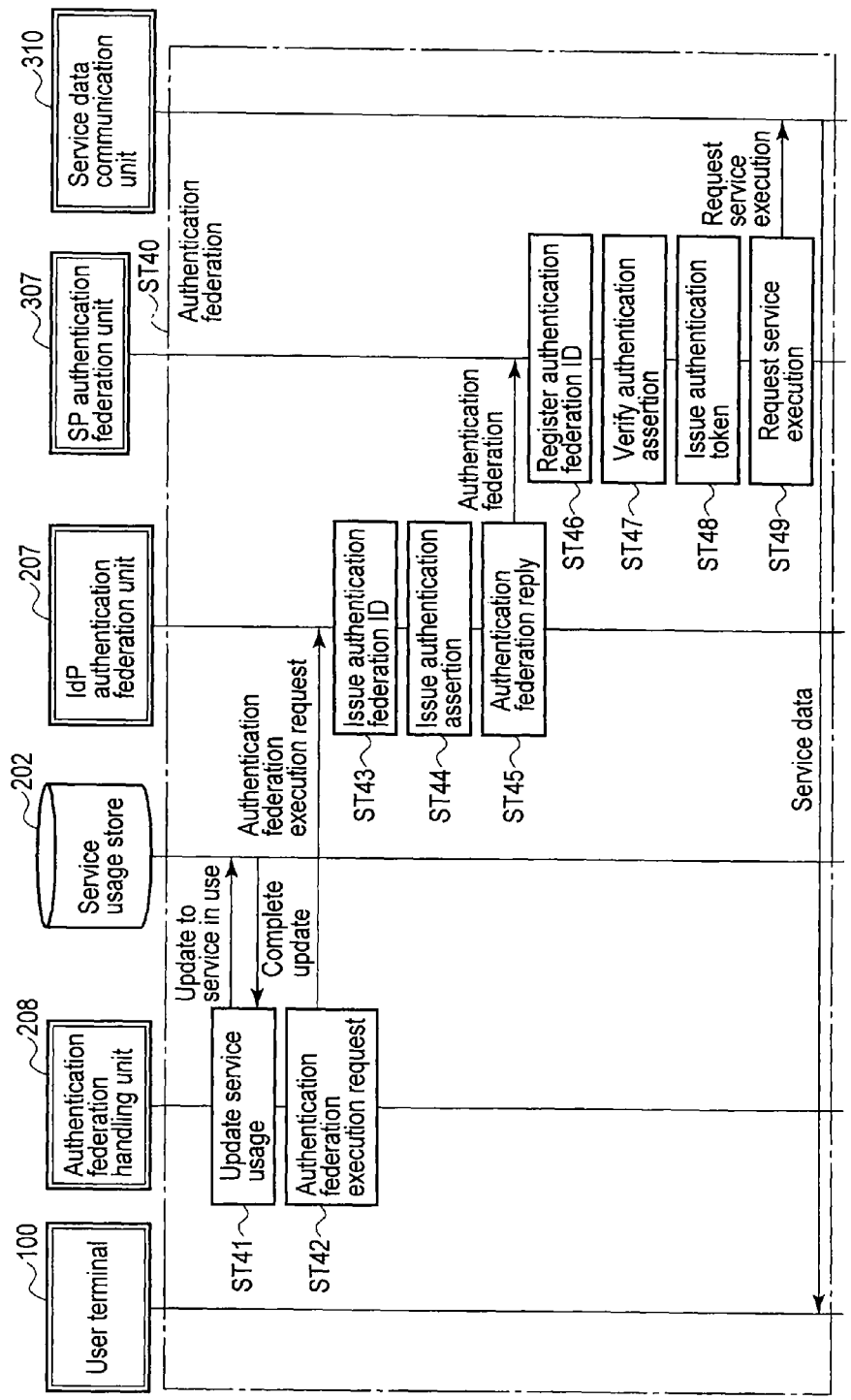
FIG. 21 is a sequence diagram showing a process flow of authentication federation according to the embodiment.

Next is an explanation of the following parts shown in FIG. 14: user authentication in step ST10 (ST11 to ST18), authentication federation policy evaluation in step ST20 (ST21 to ST27), account federation in step ST30 (ST31 to ST37), and authentication federation in step ST40 (ST41 to ST49).

In the processing of the user authentication in step ST10, a service request is transmitted to the service provider device 300 from the user terminal 100, and the ID provider device 200 authenticates the user on behalf of the service provider device 300 in a condition in which the account of the user belonging to the organization of the ID provider is not registered in the service provider device 300. A sequence diagram in FIG. 15 and a schematic diagram in FIG. 16 are used in the following explanation.

In step ST11, the user operates the user terminal 100 to use a service at the service provider device 300. The user terminal 100 transmits a service request to the service provider device 300 in accordance with the user operation. In the service provider device 300, the SP authentication federation unit 307 in charge of access management catches the service request.

In step ST12, in response to the service request from the user, the SP authentication federation unit 307 judges whether the service request includes an authentication token. For example, when the service request from the user is an HTTP request, it is ascertained that the presence of the authentication token issued by the service provider device 300 is present in a cookie included in the HTTP request.

If the presence of the authentication token can be ascertained, the service provider device 300 provides the user with the service requested by the service request. That is, if the SP authentication federation unit 307 judges that the service request includes an authentication token, the service data communication unit 310 transmits the authentication token and the service data 303*a* in the service data store 303 to the user terminal 100. Specifically, the SP authentication federation unit 307 outputs, to the service data communication unit 310, a service execution request including the authentication token in the service request and the user ID which is associated with the authentication token in the temporary storage unit 305 via the authentication federation ID.

On the other hand, when it is judged that the service request includes no authentication token, step ST13 is performed. When steps ST13 and ST14 are omitted as described later, step ST15 is performed.

In step ST13, in order for the user to select the ID provider to which the user belongs, the SP authentication federation unit 307 reads, from the trusted IdP store 301, the IdP list 301*a* showing a list of ID providers with which circles of trust are previously established, and transmits the IdP list 301*a* to the user terminal 100. The IdP list 301*a* may be called an ID provider list.

In step ST14, the user terminal 100 displays the IdP list 301*a* received from the service provider device 300, and prompts the user to select its ID provider. The user terminal 100 then transmits the selected ID provider ID to the service provider device 300 in accordance with the user operation. Steps ST13 and ST14 are omitted when the selection of an ID provider is unnecessary, for example, when the service request includes the specification of an ID provider or when the service provider device 300 only federates with the ID provider device 200 of one ID provider.

In step ST15, in accordance with the ID provider ID received from the user terminal 100, the service provider device 300 makes an authentication federation request to the ID provider device 200 identified by the ID provider ID. In this case, the authentication federation request may be directly transmitted to the ID provider device 200 from the service provider device 300, or may be transmitted via the user terminal 100 in a redirected manner. The authentication federation request may include the service provider ID of the service provider device 300 and the address information for the user terminal 100.

In step ST16, the authentication federation handling unit 208 of the ID provider device 200 intercepts the message addressed to the ID provider device 200. The authentication federation handling unit 208 analyzes the message. When ascertaining that the message is an authentication federation request, the authentication federation handling unit 208 starts the processing for authentication federation, and transmits, to the IdP authentication federation unit 207, the authentication federation request including the address information for the user terminal 100 in the authentication federation request. When it is ascertained that the message is a message other than the authentication federation request, the service provider device 300 retransmits the message to a desired address through the intermediation of the authentication federation handling unit 208.

In step ST17, in response to a user authentication request, the IdP authentication federation unit 207 performs log-in processing for the identification and authentication of the user in accordance with the user authentication request. In this log-in processing, the IdP authentication federation unit 207 transmits a log-in request to the user terminal 100 in accordance with address information for the user terminal 100 in the output user authentication request, and authenticates the user ID and user authentication information received from the user terminal 100 in accordance with the user ID and the reference information in the IdP user repository 201.

In step ST18, the IdP authentication federation unit 207 reports, to the authentication federation handling unit 208, a message of user authentication completion including the user ID used in the log-in processing and the successful authentication when the log-in processing in step ST17 is successful.

Consequently, the user authentication in step ST10 (ST11 to ST18) is finished.

In the authentication federation policy evaluation in step ST20, the service usage, the user attribute information 201a, and the authentication federation policies 203a are used as input values to perform the authentication federation policy evaluation after the end of the user authentication, and the service request from the user is permitted. A sequence diagram in FIG. 17 and a schematic diagram in FIG. 18 are used in the following explanation.

In step ST21, the authentication federation handling unit 208 analyzes the message of user authentication completion received in step ST18, and ascertains that the log-in processing is successful. When the log-in processing is successful, the authentication federation handling unit 208 outputs, to the authentication federation policy evaluation unit 209, a policy evaluation request for the service request from the user. The policy evaluation request includes the user ID acquired in the process of step ST17, that is, the IdP account of the user, and the service provider ID in the authentication federation request.

The authentication federation handling unit 208 then collects information necessary for the evaluation of the authentication federation policies 203a through steps ST22 to ST25.

In step ST22, the authentication federation policy evaluation unit 209 reads the user's service usage from the service usage store 202 in accordance with the user ID and the service provider ID in the policy evaluation request. However, step ST22 is omitted in the case of static policy evaluation described later. This also applies to step ST23.

Here, the service usage store 202 manages two information groups shown in FIG. 3. For example, as shown in the upper part of FIG. 3, information regarding the usage of one or more service provider devices 300 with which the ID provider device 200 federates on a user basis is stored. For example, regarding a record in which the user ID in FIG. 10 is user_0020, SP(1) indicates a service unused, SP(2) indicates a service in use, SP(3) indicates a service suspended, and SP(N) indicates service use ended. As shown in the lower part of FIG. 3, the number of users using each service provider device 300, and the upper limit value of the number of users who can use this service provider device 300 are stored for each service provider device 300.

In the present embodiment, with reference to FIG. 3, it is assumed from now on that the user ID is user_0001 and that the service provider device 300 requested by the user is SP(1).

In step ST23, the authentication federation policy evaluation unit 209 acquires the usage by the users managed by the service provider device 300 from the usage providing unit 308 in accordance with the user ID in the policy evaluation request.

However, step ST23 is not performed in the case where services of all the other service provider devices 300 other than the service provider device 300 desired by the user are not used as in the present embodiment. With reference to FIG. 3, a record having a user ID user_0001 corresponds.

Step ST23 is performed in the cases of user IDs user_0020 and user_1000 in FIG. 3. These cases occur when not only information at the ID provider but also information managed at the other service provider devices 300 should be included as an evaluation index of the authentication federation policy 203a. An example of the information managed at the other service provider devices 300 is a charge imposed when the user uses a service, that is, a usage-based rate. Thus, the information that changes with time is also included as an evaluation index of the authentication federation policies 203a to enable dynamic access control (=dynamic policy evaluation) of the service use by the user. For the dynamic access control, not only the aforementioned usage-based rate but also, for example, the current use count of a service and its upper limit value may be managed.

In step ST24, the authentication federation policy evaluation unit 209 reads the user attribute information 201a from the IdP user repository 201 in accordance with the user ID in the policy evaluation request. In the present embodiment, the user attribute information is as shown in FIG. 2.

In step ST25, the authentication federation policy evaluation unit 209 reads the authentication federation policies 203a from the authentication federation policy store 203 in accordance with the service provider ID in the policy evaluation request. In the present embodiment, a first authentication federation policy (policy for the use of the SP(1)) 203aA associated with A in FIG. 4 is read as a search result among the authentication federation policies 203a in FIG. 4.

In step ST26, when performing the static policy evaluation, the authentication federation policy evaluation unit 209 judges whether to permit the transmission of the service data 303a in accordance with whether the position and post in the user attribute information 201a read in step ST24 conform to the position and post indicated in the authentication federation policy 203a read in step ST25.

However, when the dynamic policy evaluation that uses the service usage in step ST22 is performed, policy evaluation is performed in accordance with the service usage, the user attribute information 201a, and the authentication federation policy 203aA acquired in steps ST22, ST24, and ST25.

Policy evaluation of the use of the SP(1) shown in the authentication federation policy 203aA is described by way of example. Service use conditions [1] to [4] are previously defined in the authentication federation policy 203aA ([4] is not defined in the case of the static policy evaluation), and it is ascertained as stated below that the collected service usage and user attribute information 201a satisfy all these service use conditions. A service request from the user is permitted accordingly.

[1] of the authentication federation policy 203aA: The authentication federation policy 203a indicates that the department to which the user belongs is X. In the meantime, as shown in FIG. 2, the department to which the user belongs in the user attributes is an "X department". Therefore, the condition of [1] in the authentication federation policy 203a is satisfied.

[2] of the authentication federation policy 203aA: The authentication federation policy 203a indicates that the section to which the user belongs is Y. In the meantime, as shown in FIG. 2, the department to which the user belongs in the user attributes is a "Y section". Therefore, the condition of [2] in the authentication federation policy 203a is satisfied.

[3] of the authentication federation policy 203aA: The authentication federation policy 203a indicates that the post of the user is equal to or higher than Z. In the meantime, as shown in FIG. 2, the post of the user is a "Z post". Therefore, the condition of [3] in the authentication federation policy 203a is satisfied.

[4] of the authentication federation policy 203aA: The authentication federation policy 203a indicates that the number of accounts being used is not beyond the upper limit value. In the meantime, as shown in FIG. 3, the use counts of the service is 10, and is not beyond an upper limit value of 100. Therefore, the condition of [4] in the authentication federation policy 203a is satisfied.

As described above, the collected service usage and user attribute information 201a are used to perform the authentication federation policy evaluation from the service request from the user in accordance with the previously defined authentication federation policy 203a. If it is ascertained that even one of the aforementioned conditions is not satisfied, the result of the authentication federation policy evaluation is rejected.

In step ST27, the authentication federation policy evaluation unit 209 outputs, to the authentication federation handling unit 208, a policy evaluation result comprising the judgment result in step ST26 as a policy evaluation reply.

Consequently, the authentication federation policy evaluation in step ST20 (ST21 to ST27) is finished.

In the account federation in step ST30, an account of the user is created for the SP user repository 302 of the service provider device 300 in accordance with the policy evaluation reply obtained by the authentication federation policy evaluation (when the permission of the transmission of the service data is indicated). This enables the account federation between the ID provider device 200 and the service provider device 300 necessary as preparations for the SSO. A sequence diagram in FIG. 19 and a schematic diagram in FIG. 20 are used in the following explanation.

In step ST31, the authentication federation handling unit 208 checks the policy evaluation result included in the policy evaluation reply output in step ST27. When permitting the service request, the authentication federation handling unit 208 asks the IdP account provisioning unit 210 for an account federation request including the user ID and the service provider ID in the policy evaluation request. When the policy evaluation result indicates the rejection of the service use, the rejection of the service use is reported to the user terminal 100. In the example shown here, the policy evaluation result indicates permission, and steps ST32 to ST37 that follow are described.

In step ST32, the IdP account provisioning unit 210 reads the user setting rule 204a from the SP user setting rule store 204 in accordance with the service provider ID (e.g. SP(1)) in the output account federation. For example, when an account is registered in the service provider device 300, the user setting rule 204a includes item names of the necessary user attributes (some of the item names of the user attributes) required for each service provider device 300. Here, it is assumed that the IdP account provisioning unit 210 reads some of the item names of the user attributes as the user setting rule 204a.

In step ST33, the IdP account provisioning unit 210 acquires necessary user attribute information (user attribute partial information) comprising item names corresponding to some of the item names and item values associated with the item names in the user attribute information 201a including the user ID corresponding to the user ID in the IdP user repository 201 in accordance with some of the item names that have been read in step ST32 and the user ID in the account federation request.

In step ST34, the IdP account provisioning unit 210 adds an account registration instruction to the acquired user attribute partial information to create an account federation request message. For example, the IdP account provisioning unit 210 associates the kind of operation in the SP user repository 302 with the user attribute partial information acquired in step ST33 targeted by the operation in accordance with an operation interface opened to the public by the SP account provisioning unit 309, and thereby creates an SP account federation request message. As the account of the user is not registered in the service provider device 300 in the present embodiment, account registration is specified as the kind of operation.

In step ST35, the IdP account provisioning unit 210 transmits the created SP account federation request message to the service provider device 300 which is a transmission source of the account federation request. The SP account federation request message is received by the SP account provisioning unit 309 in the service provider device 300.

In step ST36, the SP account provisioning unit 309 newly issues an SP-side user ID (user ID at the service provider device 300) in accordance with the received SP account federation request message, and registers the SP-side user ID and the user attribute partial information 302a in the account federation request message in the SP user repository 302 in association with each other. After the registration, the SP account provisioning unit 309 reports registration completion including the user ID in the registered user attribute partial information 302a and the service provider ID in the service provider device 300 to the ID provider device 200 which is a transmission source of the account federation request message. Specifically, the registration completion is reported to the IdP account provisioning unit 210 in the ID provider device 200.

In step ST37, the IdP account provisioning unit 210 outputs an account federation reply indicating the registration completion to the authentication federation handling unit 208 when the registration completion is reported.

Consequently, the account federation in step ST30 (ST31 to ST37) is finished.

In the authentication federation in step ST40, the authentication federation, that is, the SSO is performed between the ID provider device 200 and the service provider device 300 after the end of the account federation. A sequence diagram in FIG. 21 and a schematic diagram in FIG. 22 are used in the following explanation.

In step ST41, the authentication federation handling unit 208 analyzes the result included in the account federation reply reported in step ST37. If the result is not problematic, the authentication federation handling unit 208 updates the service usage in the service usage store 202 from the service unused to the service in use in accordance with the service provider ID and the user ID included in registration completion in the output account federation reply. As a result, in the service usage store 202, the usage of the service provider device 300 requested by the user is changed from the service unused to the service in use.

In step ST42, the authentication federation handling unit 208 outputs, to the IdP authentication federation unit 207, an authentication federation execution request including the service provider ID and the user ID included in the registration completion in the account federation reply.

In step ST43, the IdP authentication federation unit 207 issues an authentication federation ID shared between the service provider device 300 identified by the service provider ID in an authentication federation execution request and the ID provider device 200 in response to the authentication federation execution request, and writes the authentication federation ID and the user ID in the authentication federation execution request into the temporary storage unit 205 in association with each other.

In step ST44, the IdP authentication federation unit 207 creates an assertion body including the issued authentication federation ID and the name of an authentication method for the log-in processing performed in step ST17. The IdP authentication federation unit 207 also generates a digital signature based on the signature generating key in the key storage unit 206 for the assertion body. The IdP authentication federation unit 207 further creates the authentication assertion 207a including the assertion body and the digital signature.

In step ST45, the IdP authentication federation unit 207 transmits an authentication federation reply including the created authentication assertion 207a to the service provider device 300 which is a transmission source of an authentication federation request. This authentication federation reply is received by the SP authentication federation unit 307 of the service provider device 300.

In step ST46, the SP authentication federation unit 307 extracts the authentication federation ID from the authentication assertion 207a in the authentication federation reply in response to the account federation reply, and writes the extracted authentication federation ID and the user ID in the user attribute partial information 302a registered in the SP user repository 302 in step ST36 into the temporary storage unit 305 in association with each other.

In step ST47, the SP authentication federation unit 307 verifies the authentication method name and the digital signature in the authentication assertion 207a in accordance with the authentication method name and the signature verification key in the authentication assertion verification policy. The SP authentication federation unit 307 judges from the authentication assertion 207a issued by the ID provider device 200 whether the verification result by the ID provider device 200 can be trusted, and determines whether to permit the transmission of the service data (service provision) to the user. In the present embodiment, all the verification results are regarded as proper, and the permission of the transmission of the service data is determined.

In step ST48, the SP authentication federation unit 307 issues an authentication token and writes the authentication token into the temporary storage unit 305 in association with the authentication federation ID when the permission is determined in step ST47.

In step ST49, the SP authentication federation unit 307 outputs, to the service data communication unit 310, a service execution request including the written authentication token and the user ID which is associated with the authentication token in the temporary storage unit 305 via the authentication federation ID. In accordance with the output authentication token, the service data communication unit 310 transmits the authentication token in the service execution request and the service data 303a in the service data store 303 to the user terminal 100.

As described above, according to the present embodiment, the authentication federation handling unit 208 provided in the ID provider device 200 intercepts the authentication federation request from the service provider device 300 in response to the service request from the user to the service provider device 300, and judges the permission of the transmission of the service data 303a in accordance with the previously defined authentication federation policy 203a. When it is judged that the transmission is permitted, the user attribute information 201a managed in the ID provider device 200 is used to create an account of the user for the SP user repository 302 managed in the service provider device 300. The ID provider device 200 and the service provider device 300 then each perform conventional authentication federation processing, and a desired service is provided to the user from the service provider device 300.

Therefore, even if the account of the user is not registered in the service provider device 300, the permission of the transmission of the service data 303a is automatically judged by the service request from the user, that is, by the timing of the execution of the SSO in accordance with the authentication federation policy 203a previously defined at the ID provider device 200. Consequently, seamless service use can be provided to the user in a nonmanual manner without the need for much time.

In service use provided under a distributed environment such as the Internet, the processing flow from the application of service use to single sign-on is automated in accordance with the previously defined service use policy and the usage of the service, so that the user can smoothly start service use.

Second Embodiment

Next, the second embodiment is described with reference to the aforementioned drawings.

The second embodiment is a specific example in which step ST23 according to the first embodiment is performed. In the example described here, the user of the user terminal 100 which has transmitted a service request is already using various other service providers and newly uses another service provider.

In this case, in step ST23 according to the first embodiment, the charge for the use of each service provider being used by the user is used as an index of the authentication federation policy evaluation, and an upper limit value of the use charge is previously defined for the authentication federation policy 203a (e.g., [4] of C in FIG. 4). As a result, the new use of another service provider is rejected.

Accordingly, as shown in FIG. 23, the usage store 304 of the service provider device 300 stores the user ID and the use charge accumulated for the service in use in the user use management table 304a in association with each other.

The usage providing unit 308 has a function to search the usage store 304 in accordance with the user ID in a use charge transmission request in response to the use charge transmission request including the user ID from the ID provider device 200, and transmit, to the ID provider device 200, a use charge reply including a use charge and the user ID obtained by the search.

Meanwhile, in the ID provider device 200, one of the authentication federation policies 203a in the authentication federation policy store 203 indicates, in association with the service provider ID, the positions and posts of the users to whom the service provider device 300 identified by the service provider ID is permitted to transmit the service data 303a, and the upper limit value of the use charge to the user (e.g., [4] of C in FIG. 4).

The authentication federation policy evaluation unit 209 further has a function to transmit the use charge transmission request including the user ID to the service provider device 300 identified by the service provider ID in accordance with the user ID and the service provider ID in the policy evaluation request transmitted from the authentication federation handling unit 208, and receive the use charge reply including the user ID and the use charge from the service provider device 300. The received use charge may be written into the user use management table 202a in the service usage store 202 in association with the user ID and the service provider ID as shown in FIG. 24, but does not necessarily have to be written.

The aforementioned transmission permission judgment function of the authentication federation policy evaluation unit 209 has a function to, when the positions and posts of the users and the upper limit value of the use charge are included in the authentication federation policy 203a read from the authentication federation policy store 203, judge whether to permit the transmission of the service data 303a in accordance with whether the position and post in the user attribute information 201a read from the IdP user repository 201 conform to the position and post indicated in the read policy information and in accordance with whether the use charge in the use charge reply received from the service provider device 300 conforms to the upper limit value of the use charge indicated in the read policy information.

Here, in the present specification, whether to permit the transmission of the service data 303a is not only judged in accordance with the position and post indicated in the read policy information as described above but may also be judged in accordance with whether the read user attribute information, the kind of service to be used by the user, the operation to be performed for a service by the user, and environmental conditions of the user for the execution of a service conform to the read policy information and in accordance with whether the use charge in the received use charge reply conforms to the upper limit value of the use charge indicated in the read policy information.

Next, the operation of the authentication federation system having the above configuration is described mainly with reference to FIG. 17.

Now, the user authentication in step ST10 (ST11 to ST18) is performed as described above.

In the authentication federation policy evaluation in step ST20, step ST21 (policy evaluation request) and step ST22 (search for service usage) are then performed as described above.

In step ST23, the authentication federation policy evaluation unit 209 transmits a use charge transmission request including the user ID to the service provider device 300 identified by the service provider ID in accordance with the user ID and the service provider ID in the policy evaluation request transmitted from the authentication federation handling unit 208.

The usage providing unit 308 of the service provider device 300 searches the usage store 304 in accordance with the user ID in the use charge transmission request, and transmits, to the ID provider device 200, a use charge reply including a use charge and the user ID obtained by the search.

The authentication federation policy evaluation unit 209 of the ID provider device 200 receives the use charge reply.

Step ST24 (search for the user attribute information 201a) and step ST25 (search for the authentication federation policy 203a) are performed as described above. However, the authentication federation policy 203a includes the upper limit value of the use charge.

In step ST26, when the positions and posts of the users and the upper limit value of the use charge are included in the authentication federation policy 203a read from the authentication federation policy store 203, the authentication federation policy evaluation unit 209 judges whether to permit the transmission of the service data 303a in accordance with whether the position and post in the user attribute information 201a read from the IdP user repository 201 conform to the position and post indicated in the read policy information and in accordance with whether the use charge in the use charge reply received from the service provider device 300 conforms to the upper limit value of the use charge indicated in the read policy information.

Processing in step ST27 (policy evaluation reply), the account federation in step ST30 (ST31 to ST37), and the authentication federation in step ST40 (ST41 to ST49) that follow are performed as described above.

As described above, according to the present embodiment, the permission of the transmission of the service data can also be judged in accordance with the use charge to the user, in addition to the advantageous effects according to the first embodiment.

Thus, the authentication federation policy 203a is introduced, and the dynamically changing service usage managed at the ID provider device 200 and the service provider device 300 is handled not on a user basis but on an ID provider basis. This enables strict authentication federation and control of service use.

In addition, in the first embodiment, a service can be smoothly used, and convenience is thereby improved. Conversely, wasteful service use is not preferable for profit-oriented organizations such as companies. It is therefore preferable to provide a structure to dynamically and flexibly control the management of use in accordance with the service usage at the user or organization level. The present embodiment and the third embodiment enable an authentication federation system comprising such a structure.

Third Embodiment

Next, the third embodiment is described with reference to the aforementioned drawings.

The third embodiment is another specific example in which step ST23 according to the first embodiment is performed. In the example described here, the service provider device 300 receives a new service request when the number of users using services has reached the upper limit value.

That is, the use count of the service provider is used as an index of the authentication federation policy evaluation, and additional conditions for the user count when exceeding the upper limit value are previously defined for the authentication federation policy 203a (e.g. [4] of B in FIG. 4). The previously defined additional conditions are as follows: If there is an idle user managed in the ID provider device 200, the account of the idle user managed in the service provider device 300 is deleted or invalidated, and an obligation condition for the registration of the account of a new user is defined (e.g., [obligation condition] of [4] of B in FIG. 4). Thus, the authentication federation policy 203a comprises the obligation condition that a vacant space resulting from the invalidation of the account of the idle user is allocated to the account of the applicant user when the use count has exceeded the upper limit value. This allows quick start of service use according to need that suits the usage in the ID provider even if the use count has exceeded the upper limit value.

In other words, one of the authentication federation policies 203a in the authentication federation policy store 203 indicates, in association with the service provider ID, the positions and posts of the users to whom the service provider device 300 identified by the service provider ID is permitted to transmit the service data 303a, the presence of a user who has passed a predetermined or longer period from the last date of use to the present among the users when the number of users has exceeded the upper limit value, and the invalidation of the user attribute partial information 302a for the present user (e.g., [4] of B in FIG. 4). The "number of users" referred to here means a value equal to the "current use count" in the service usage store 202.

Figure 25:
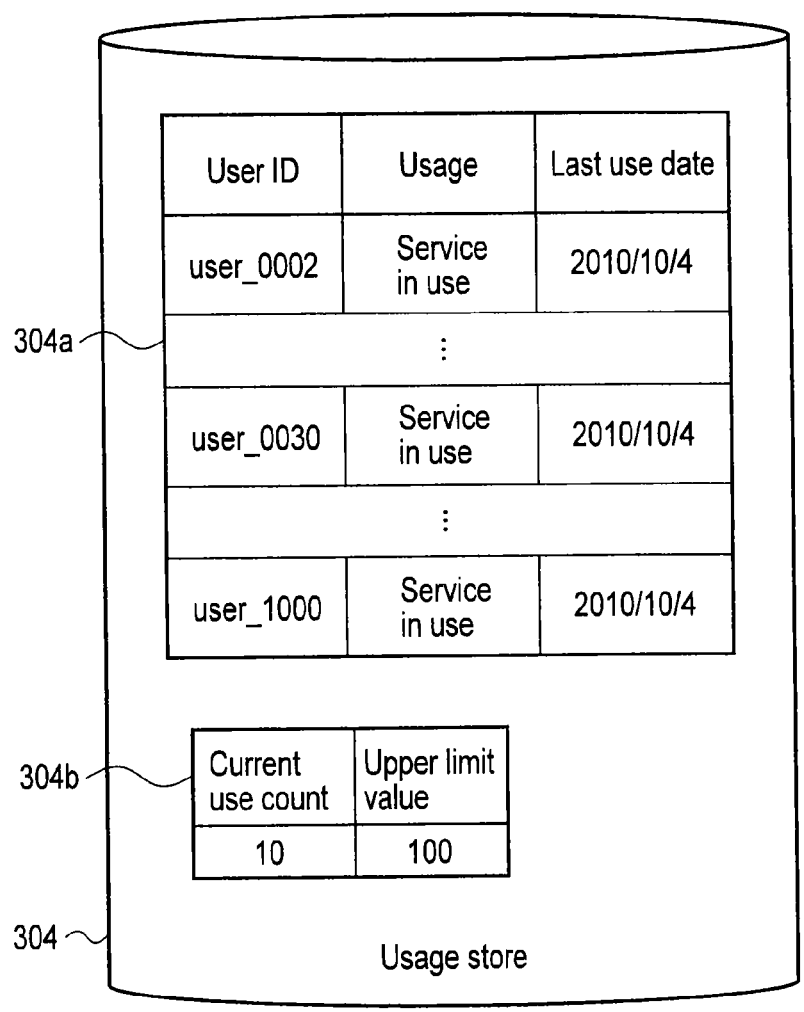
FIG. 25 is a schematic diagram illustrating a usage store according to a third embodiment.

Accordingly, as shown in FIG. 25, the usage store 304 of the service provider device 300 stores, in the user use management table 304a, last use date information including the user ID and the last use date that indicates the last date of the transmission of the service data 303a, in addition to the stored contents described above.

The usage providing unit 308 has a function to transmit the last use date information in the usage store 304 to the ID provider device 200 in response to a last use date transmission request from the ID provider device 200.

Figure 26:
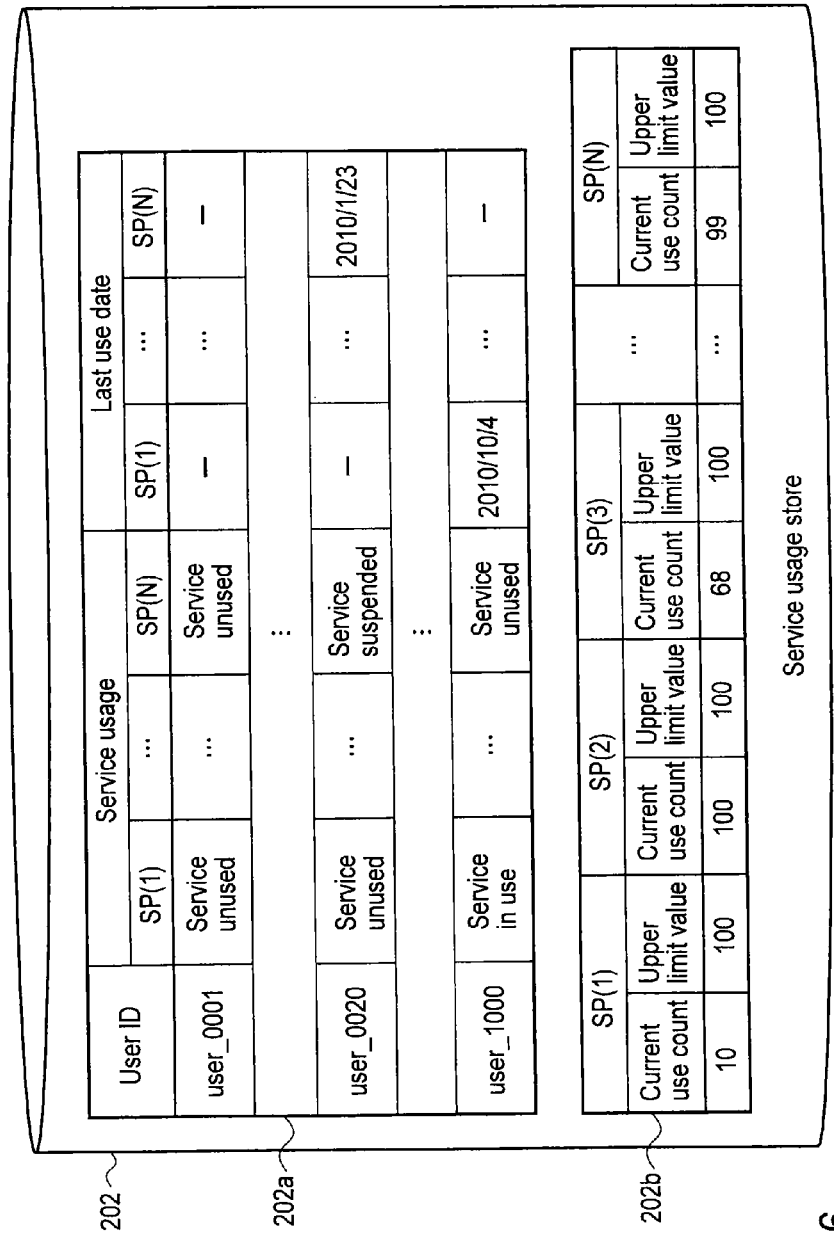
FIG. 26 is a schematic diagram illustrating a service usage store according to the embodiment.

Meanwhile, the authentication federation policy evaluation unit 209 of the ID provider device 200 has, in addition to the aforementioned functions, a function to read the use count and the upper limit value from the service usage store 202 in accordance with the service provider ID in a policy evaluation request output from the authentication federation handling unit 208, and a function to transmit the last use date transmission request to the service provider device 300 identified by the service provider ID in accordance with the service provider ID in the output policy evaluation request and receive the last use date information from the service provider device 300. The received last use date information may be written into the user use management table 202a in the service usage store 202 in association with the user ID and the service provider ID as shown in FIG. 26, but does not necessarily have to be written.

The aforementioned transmission permission judgment function of the authentication federation policy evaluation unit 209 has a function to, when the positions and posts of the users, the presence of a user who has passed a predetermined or longer period when the upper limit value of the use count is exceeded, and the invalidation of the user attribute partial information 302a for the present user are included in the authentication federation policy 203a read from the authentication federation policy store 203, judge whether to permit the transmission of the service data 303a in accordance with whether the position and post in the user attribute information 201a read from the IdP user repository 201 conform to the position and post indicated in the read authentication federation policy 203a and in accordance with whether the last use date in the last use date information received from the service provider device 300 by transmitting the last use date transmission request to the service provider device 300 when the use count read from the service usage store 202 has exceeded the upper limit value read from the service usage store 202 conform to the predetermined period in the read authentication federation policy 203a or a longer period.

Next, the operation of the authentication federation system having the above configuration is described mainly with reference to FIG. 17.

Now, the user authentication in step ST10 (ST11 to ST18) is performed as described above.

In the authentication federation policy evaluation in step ST20, step ST21 (policy evaluation request) and step ST22 (search for service usage) are then performed as described above. In step ST22, the use count and the upper limit value are read from the service usage store 202 in accordance with the service provider ID in a policy evaluation request.

In step ST23, the authentication federation policy evaluation unit 209 transmits a last use date transmission request to the service provider device 300 identified by the service provider ID in accordance with the user ID and the service provider ID in the policy evaluation request output from the authentication federation handling unit 208.

The usage providing unit 308 of the service provider device 300 transmits the last use date information in the usage store 304 to the ID provider device 200 in response to the last use date transmission request.

The authentication federation policy evaluation unit 209 of the ID provider device 200 receives the last use date information.

Step ST24 (search for the user attribute information 201a) and step ST25 (search for the authentication federation policy 203a) are then performed as described above. However, the authentication federation policy 203a indicates, in association with the service provider ID, the positions and posts of the users to whom the service provider device 300 identified by the service provider ID is permitted to transmit the service data 303a, the presence of a user who has passed a predetermined or longer period from the last date of use to the present among the users when the number of users has exceeded the upper limit value, and the invalidation of the user attribute partial information 302a for the present user (e.g., [4] of B in FIG. 4).

In step ST26, the authentication federation policy evaluation unit 209 determines whether to permit federation in accordance with the authentication federation policy indicated by 203aB in FIG. 4. If the positions and posts of the users, the presence of a user who has passed a predetermined or longer period when the number of users has exceeded the upper limit value, and the invalidation of the user attribute partial information 302a for the present user are included in the authentication federation policy 203a read from the authentication federation policy store 203, whether to permit the transmission of the service data 303a is judged in accordance with whether the position and post in the user attribute information 201a read from the IdP user repository 201 conform to the position and post indicated in the read authentication federation policy 203a and in accordance with whether the last use date in the last use date information received from the service provider device 300 by transmitting the last use date transmission request to the service provider device 300 when the use count read from the service usage store 202 has exceeded the upper limit value read from the service usage store 202 conform to the predetermined period in the read authentication federation policy 203a or a longer period.

In step ST27 (policy evaluation reply), the authentication federation policy evaluation unit 209 returns an evaluation result with an obligation condition that "the SP account of the user who has used no services for over half a year is invalidated" from B[4] in the authentication federation policy 203a in FIG. 4 to the authentication federation handling unit 208 in addition to the permission given by the authentication federation policy evaluation unit 209. At the same time, the user ID of the user to be invalidated is also assigned to the evaluation result.

Processing in the account federation in step ST30 (ST31 to ST37) and the authentication federation in step ST40 (ST41 to ST49) that follow is performed as described above. As a condition is included as the evaluation result of the authentication federation policy in the present embodiment, the following processing is added to step ST33 (search for the user attribute information) and step ST34 (transmission of SP account federation request message).

First, in step ST33, the IdP account provisioning unit 210 searches for attribute information necessary to invalidate the account of the user to be invalidated, in addition to the user attribute information. In step ST34, the IdP account provisioning unit 210 creates an account federation request message with an account update instruction to invalidate the account of the user to be invalidated as well as user attribute partial information and an account registration instruction for the user.

As described above, according to the present embodiment, in addition to the advantageous effects according to the first embodiment, an obligation condition that a vacant space resulting from the invalidation of the account of the idle user is allocated to the account of the applicant user when the use count has exceeded the upper limit value is added to the authentication federation policy 203a. This configuration allows a quick start of service use that suits the usage in the ID provider even if the use count has exceeded the upper limit value.

In the configuration according to at least one of the embodiments described above, the authentication federation policy store 203 and the authentication federation policy evaluation unit 209 are provided. A plurality of authentication federation policies 203a indicating the positions and posts of the users to whom the service data 303a is permitted to be transmitted are stored in the authentication federation policy store 203 for each service provider ID. The authentication federation policy evaluation unit 209 judges whether to permit the transmission of the service data 303a in accordance with whether the position and post in the read user attribute information 201a conform to the position and post indicated in the read authentication federation policy 203a. It is thereby possible to determine whether to permit service use in a nonmanual manner when performing account registration and federation in the process of the SSO.

In addition, a conventional data processing system involves the task of checking that a service provider does not hold information sufficient to register an account and requesting deficient user attributes from an ID provider. The check and request are manually performed.

On the other hand, in the configuration according to at least one of the embodiments, the authentication federation policy 203a is previously stored, so that the conventional manual check and request are eliminated.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An authentication federation system, comprising:
an ID provider device which is configured to perform log-in processing for a user terminal operable by a user and which has a first memory; and
a plurality of service provider devices which are configured to transmit service data to the user terminal when the log-in processing is successful and which have second memories,
the ID provider device comprising:
a user attribute information storage unit which stores pieces of user attribute information in which item names of user attributes to identify the user are associated with item values of the user attributes, the item names including at least a user ID to identify the user,
a service usage storage unit which stores the user ID, service provider IDs, and service usage in association with one another, each of the service provider devices being identifiable by one of the service provider IDs, the service usage indicating a service in use indicating that the transmission of the service data is permitted, or a service unused indicating that the transmission of the service data is not permitted,
a policy storage unit which stores pieces of policy information for each service provider ID of the service provider IDs, the policy information indicating the user to whom at least one of the service provider devices identified by a corresponding at least one of the service provider IDs is permitted to transmit the service data, an item name storage unit which stores some of the item names of the user attributes in the user attribute information in association with the corresponding at least one of the service provider IDs, a key storage unit which stores a signature generating key for the ID provider device, a first logic which outputs a user authentication request in response to an authentication federation request which is transmitted from one of the service provider devices and which includes the service provider ID for said one of the service provider devices and the address information for the user terminal, the user authentication request including the address information for the user terminal in the authentication federation request, a second logic which performs the log-in processing to transmit a log-in request to the user terminal in accordance with the address information for the user terminal in the user authentication request, and authenticates the user ID and user authentication information received from the user terminal in accordance with the user ID and the reference information in the user attribute information storage unit, a third logic which outputs a policy evaluation request including the user ID used in the log-in processing and the service provider ID in the authentication federation request when the log-in processing is successful, a fourth logic which reads the user attribute information from the user attribute information storage unit in accordance with the user ID in an output policy evaluation request which is the policy evaluation request output from the third logic, a fifth logic which reads the policy information from the policy storage unit in accordance with the service provider ID in the output policy evaluation request, a transmission permission judging logic which judges whether to permit the transmission of the service data in accordance with a read user attribute information which is the user attribute information read from the user attribute information storage unit, a kind of service to be used by the user, the operation to be performed for the service by the user, and environmental conditions of the user for execution of the service conforming to a read policy information which is the policy information read from the policy storage unit, a sixth logic which outputs a policy evaluation reply including a judgment result to a transmission source of the policy evaluation request, a seventh logic which outputs an account federation request including the user ID and the service provider ID in the policy evaluation request when the judgment result in the policy evaluation reply indicates permission, an eighth logic which reads some of the item names of the user attributes from the item name storage unit in accordance with the service provider ID in an output account federation request which is the account federation request output from the seventh logic, a ninth logic which acquires user attribute partial information comprising item names corresponding to some of the item names and item values associated with the item names in the user attribute information including the user ID corresponding to the user ID in the user attribute information storage unit in accordance with some of the item names that have been read and the user ID in the account federation request, a tenth logic which adds an account registration instruction to the acquired user attribute partial information to create an account federation request message, an eleventh logic which transmits the account federation request message to the service provider device which is a transmission source of the account federation request, a twelfth logic which outputs an account federation reply indicating registration completion when the service provider device which is a transmission destination of the account federation request message reports the registration completion including the service provider ID of the service provider device and the user ID in the user attribute partial information, a thirteenth logic which updates the service usage in the service usage storage unit from the service unused to the service in use in accordance with the service provider ID and the user ID included in the registration completion in an output account federation reply which is the account federation reply output from the twelfth logic, a fourteenth logic which outputs an authentication federation execution request including the service provider ID and the user ID included in the registration completion in the output account federation reply, a fifteenth logic which issues an authentication federation ID shared between the service provider device identified by the service provider ID in the authentication federation execution request and the ID provider device in response to the authentication federation execution request, and writes the authentication federation ID and the user ID in the authentication federation execution request into the first memory in association with each other, a sixteenth logic which generates a digital signature based on the signature generating key for an assertion body including an issued authentication federation ID which is the authentication federation ID issued by the fifteenth logic and a name of an authentication method for the log-in processing, and creates an authentication assertion including the assertion body and the digital signature, and a seventeenth logic which transmits an authentication federation reply including the created authentication assertion to the service provider device which is a transmission source of the authentication federation request, each of the service provider devices comprising a user attribute partial information storage unit which stores the user attribute partial information and an SP-side user ID in association with each other, some of the item names and item values of the user attributes in the user attribute information in the user attribute information storage unit being associated with one another in the user attribute partial information, the SP-side user ID serving to identify the user in the service provider device, a verification policy storage unit which stores an authentication assertion verification policy including the name of an authentication method for the log-in processing to permit the transmission of the service data when the log-in processing is successful, and a signature verification key corresponding to the signature generating key, a service data storage unit which stores the service data, an eighteenth logic which judges whether a service request includes an authentication token in response to the service request from the user terminal, and transmits the authentication token and the service data in the service data storage unit to the user terminal when the service request includes the authentication token, or transmits an authentication federation request including the service provider ID of the service provider device and the address information for the user terminal to the ID provider device when the service request does not include the authentication token, a nineteenth logic which issues a new SP-side user ID when receiving the account federation request message, and registers the new SP-side user ID and the user attribute partial information in a received account federation request message in the user attribute partial information storage unit in association with each other, the received account federation request message which is the account federation request message received from the ID provider device, a twentieth logic which reports, after the registration, registration completion including the user ID in the user attribute partial information and the service provider ID in the service provider device to the ID provider device which is a transmission source of the received account federation request message, a twenty-first logic which extracts an authentication federation ID from the authentication assertion in the authentication federation reply in response to the authentication federation reply from the ID provider device, and writes an extracted authentication federation ID which is the authentication federation extracted from the authentication assertion and the user ID in the user attribute partial information into a second memory in association with each other, a verification logic which verifies the authentication method name and the digital signature in the authentication assertion in accordance with the authentication method name and the signature verification key in the authentication assertion verification policy, a twenty-second logic which issues an authentication token and writes the authentication token into the second memory in association with the authentication federation ID when all verification results are proper, a twenty-third logic which outputs a service execution request including the authentication token in the second memory and the user ID which is associated with the authentication token in the second memory via the authentication federation ID, and a twenty-fourth logic which transmits the authentication token in the service execution request and the service data in the service data storage unit in accordance with the service execution request.

2. The authentication federation system according to claim 1, wherein
each of the service provider devices further comprises
a use charge storage unit which stores the user ID and a use charge accumulated for the service in use in association with each other, and
a twenty-fifth logic which searches the use charge storage unit in accordance with the user ID in a use charge transmission request in response to the use charge transmission request including the user ID from the ID provider device, and transmits, to the ID provider device, a use charge reply including the use charge and the user ID obtained by the search,
one of the pieces of policy information indicates, in association with the service provider ID, the environmental conditions of the user to whom the service provider device identified by the service provider ID is permitted to transmit the service data, and an upper limit value of the use charge to the user,
the ID provider device further comprises
a twenty-sixth logic which transmits the use charge transmission request including the user ID to the service provider device identified by the service provider ID in accordance with the user ID and the service provider ID in the output policy evaluation request, and receives the use charge reply including the user ID and the use charge from the service provider device, and
the transmission permission judging logic judges whether to permit the transmission of the service data in accordance with whether the read user attribute information, the kind of service to be used by the user, the operation to be performed for a service by the user, and the environmental conditions of the user for the execution of a service conform to the read policy information and in accordance with whether the use charge in the use charge reply conforms to the upper limit value of the use charge indicated in the read policy information.

3. The authentication federation system according to claim 1, wherein
one of the pieces of policy information indicates, in association with the service provider ID, the environmental conditions of the user to whom the service provider device identified by the service provider ID is permitted to transmit the service data, the presence of a user who has passed a predetermined or longer period from a last date of use to the present among the users when a number of users has exceeded an upper limit value, and invalidation of the user attribute partial information for a present user,
each of the service provider devices further comprises
a last use date storage unit which stores last use date information including the user ID and the last use date that indicates the last date of the transmission of the service data, and
a twenty-seventh logic which transmits the last use date information in the last use date storage unit to the ID provider device in response to a last use date transmission request from the ID provider device,
the ID provider device further comprises
a service use count storage unit which stores, in association with one another, the service provider ID, a user count which indicates number of services used shown by the service usage associated with the service provider ID and which is equal to the number of the users, and an upper limit value of a use count,
a twenty-eighth logic which reads the use count and the upper limit value from the service usage storage unit in accordance with the service provider ID in the output policy evaluation request, and
a twenty-ninth logic which transmits the last use date transmission request to the service provider device identified by the service provider ID in accordance with the service provider ID in the output policy evaluation request, and receiving the last use date information from the service provider device, and
the transmission permission judging logic comprises
a thirtieth logic which judges whether to permit the transmission of the service data in accordance with whether the read user attribute information, the kind of service to be used by the user, the operation to be performed for a service by the user, and the environmental conditions of the user for the execution of a service conform to the read policy information in the case where the read policy information includes the presence of a user who has passed the predetermined or longer period when the upper limit value of the use count of the user is exceeded, and the invalidation of the user attribute partial information for the present user, and in accordance with whether the last use date in the last use date information received from the service provider device by transmitting the last use date transmission request to the service provider device when the use count read from the service usage storage unit has exceeded the upper limit value read from the service use count storage unit conform to a predetermined period in the read policy information or a longer period, and a thirty-first logic which transmits, to the service provider device, an invalidation request including the user ID of the user which is used in judgment and which has passed the predetermined period or longer when the judgment result indicates permission.

4. An ID provider device which is configured to perform log-in processing for a user terminal operable by a user and which has a first memory, the ID provider device being configured to communicate with a plurality of service provider devices, the service provider devices being configured to transmit service data to the user terminal when the log-in processing is successful in the ID provider device and having second memories, the ID provider device comprising:

a user attribute information storage unit which stores pieces of user attribute information in which item names of user attributes to identify the user are associated with item values of the user attributes, the item names including at least a user ID to identify the user, a service usage storage unit which stores the user ID, service provider IDs, and service usage in association with one another, each of the service provider devices being identifiable by one of the service provider IDs, the service usage indicating a service in use indicating that the transmission of the service data is permitted, or a service unused indicating that the transmission of the service data is not permitted, a policy storage unit which stores pieces of policy information for each service provider ID of the service provider IDs, the policy information indicating environmental conditions of the user to whom at least one of the service provider devices identified by a corresponding at least one of the service provider IDs is permitted to transmit the service data, an item name storage unit which stores some of the item names of the user attributes in the user attribute information in association with the service provider ID, a key storage unit which stores a signature generating key for the ID provider device, a first logic which outputs a user authentication request in response to an authentication federation request which is transmitted from one of the service provider devices and which includes the service provider ID for said one of the service provider devices and the address information for the user terminal, the user authentication request including the address information for the user terminal in the authentication federation request, a second logic which performs the log-in processing to transmit a log-in request to the user terminal in accordance with the address information for the user terminal in the user authentication request, and authenticates the user ID and user authentication information received from the user terminal in accordance with the user ID and the reference information in the user attribute information storage unit, a third logic which outputs a policy evaluation request including the user ID used in the log-in processing and the service provider ID in the authentication federation request when the log-in processing is successful, a fourth logic which reads the user attribute information from the user attribute information storage unit in accordance with the user ID in an output policy evaluation request which is the policy evaluation request output from the third logic, a fifth logic which reads the policy information from the policy storage unit in accordance with the service provider ID in the output policy evaluation request, a transmission permission judging logic which judges whether to permit the transmission of the service data in accordance with a read user attribute information which is the user attribute information read from the user attribute information storage unit, a kind of service to be used by the user, the operation to be performed for the service by the user, and environmental conditions of the user for execution of the service conform to a read policy information which is the policy information read from the policy storage unit, a sixth logic which outputs a policy evaluation reply including a judgment result to a transmission source of the policy evaluation request, a seventh logic which outputs an account federation request including the user ID and the service provider ID in the policy evaluation request when the judgment result in the policy evaluation reply indicates permission, an eighth logic which reads some of the item names of the user attributes from the item name storage unit in accordance with the service provider ID in an output account federation request which is the account federation request output from the seventh logic, a ninth logic which acquires user attribute partial information comprising item names corresponding to some of the item names and item values associated with the item names in the user attribute information including the user ID corresponding to the user ID in the user attribute information storage unit in accordance with some of the item names that have been read and the user ID in the account federation request, a tenth logic which adds an account registration instruction to the acquired user attribute partial information to create an account federation request message, an eleventh logic which transmits the account federation request message to the service provider device which is a transmission source of the account federation request, a twelfth logic which outputs an account federation reply indicating registration completion when the service provider device which is a transmission destination of the account federation request message reports the registration completion including the service provider ID of the service provider device and the user ID in the user attribute partial information, a thirteenth logic which updates the service usage in the service usage storage unit from the service unused to the service in use in accordance with the service provider ID and the user ID included in the registration completion in an output account federation reply which is the account federation reply output from the twelfth logic, a fourteenth logic which outputs an authentication federation execution request including the service provider ID and the user ID included in the registration completion in the output account federation reply, a fifteenth logic which issues an authentication federation ID shared between the service provider device identified by the service provider ID in the authentication federation execution request and the ID provider device in response to the authentication federation execution request, and writes the authentication federation ID and the user ID in the authentication federation execution request into the first memory in association with each other, a sixteenth logic which generates a digital signature based on the signature generating key for an assertion body including an issued authentication federation ID which is the authentication federation ID issued by the fifteenth logic and a name of an authentication method for the log-in processing, and creates an authentication assertion including the assertion body and the digital signature, and a seventeenth logic which transmits an authentication federation reply including the created authentication assertion to the service provider device which is a transmission source of the authentication federation request, wherein each of the service provider devices judges whether a service request includes an authentication token in response to the service request from the user terminal, and transmits the authentication token and the service data in the service data storage unit to the user terminal when the service request includes the authentication token, or transmits an authentication federation request including the service provider ID of the service provider device and the address information for the user terminal to the ID provider device when the service request does not include the authentication token, issues a new SP-side user ID when receiving the account federation request message, and registers the new SP-side user ID and the user attribute partial information in a received account federation request message in association with each other, the received account federation request message which is the account federation request message received from the ID provider device, reports, after the registration, registration completion including the user ID in the user attribute partial information and the service provider ID in the service provider device to the ID provider device which is a transmission source of the received account federation request message, extracts an authentication federation ID from the authentication assertion in the authentication federation reply in response to the authentication federation reply from the ID provider device, and writes an extracted authentication federation ID which is the authentication federation extracted from the authentication assertion and the user ID in the user attribute partial information into a second memory in association with each other, and then verifies the authentication method name and the digital signature in the authentication assertion in accordance with the authentication method name and the signature verification key in a previously stored authentication assertion verification policy, and issues an authentication token and writes the authentication token into the second memory in association with the authentication federation ID when all verification results are proper, and then outputs a service execution request including the authentication token in the second memory and the user ID which is associated with the authentication token in the second memory via the authentication federation ID, and transmits the authentication token in the service execution request and the previously stored service data to the user terminal in accordance with the service execution request.

\* \* \* \* \*